United States Patent
Honda et al.

(10) Patent No.: US 7,837,226 B2
(45) Date of Patent: Nov. 23, 2010

(54) AIRBAG APPARATUS

(75) Inventors: Kensaku Honda, Aichi-ken (JP); Yuji Sato, Aichi-ken (JP); Koji Shibayama, Aichi-ken (JP); Atsushi Nagata, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 12/591,852

(22) Filed: Dec. 3, 2009

(65) Prior Publication Data

US 2010/0140906 A1 Jun. 10, 2010

(30) Foreign Application Priority Data

Dec. 9, 2008 (JP) ............................... 2008-313627
Mar. 26, 2009 (JP) ............................... 2009-076678

(51) Int. Cl.
*B60R 21/26* (2006.01)
(52) U.S. Cl. .................................... 280/730.2
(58) Field of Classification Search ................. 280/729, 280/730.2, 742, 743.1
See application file for complete search history.

(56) References Cited

U.S. PATENT DOCUMENTS

| | | | | |
|---|---|---|---|---|
| 5,556,128 A * | 9/1996 | Sinnhuber et al. | ........ | 280/730.2 |
| 5,848,804 A * | 12/1998 | White et al. | ............. | 280/730.2 |
| 6,802,529 B2 * | 10/2004 | Takedomi et al. | ........ | 280/743.1 |
| 7,661,699 B2 * | 2/2010 | Buhrlen et al. | ............... | 280/729 |
| 2004/0124615 A1 * | 7/2004 | Tanase et al. | ............ | 280/730.2 |
| 2004/0160040 A1 * | 8/2004 | Takedomi et al. | ........... | 280/729 |
| 2005/0189742 A1 * | 9/2005 | Kumagai et al. | ......... | 280/730.2 |
| 2006/0001244 A1 * | 1/2006 | Taguchi et al. | .............. | 280/729 |

(Continued)

FOREIGN PATENT DOCUMENTS

JP A-2005-022473 1/2005

(Continued)

*Primary Examiner*—Paul N Dickson
*Assistant Examiner*—Robert A Coker
(74) *Attorney, Agent, or Firm*—Posz Law Group, PLC

(57) ABSTRACT

A check valve 60 is formed by a pair of the valve body portions 61. Ends of the valve body portions 61 that are close to an upper inflation portion EU are joined to a communication passage wall 51 by an outflow-side joint portion 41. Each valve body portion 61 includes a flexible portion 64 that is located in the vicinity of the outflow-side joint portion 41 and between the outflow-side joint portion 41 and a lower inflation portion EL. The front edges of the valve body portions 61 are joined to the communication passage wall 51 by a first edge joint portion 67. The first edge joint portion 67 also functions as a wall joint portion 63 that joins the communication passage walls 51 to each other. The rear ends of the valve body portions 61 are joined to each other by a second edge joint portion 68, which extends along the flowing direction of inflation gas. An auxiliary joint portion 69 is located between the first edge joint portion 67 and the second edge joint portion 68, and in the vicinity of the second edge joint portion 68. The auxiliary joint portion 69 joins the valve body portions 61 to each other. The auxiliary joint portion 69 also functions as a rigid portion 65, which is harder to flex than the flexible portion 64. The rigid portion 65 extends along the flowing direction of the inflation gas.

9 Claims, 18 Drawing Sheets

U.S. PATENT DOCUMENTS

| | | | |
|---|---|---|---|
| 2006/0038386 A1* | 2/2006 | Shibayama et al. | 280/730.2 |
| 2006/0076759 A1* | 4/2006 | Tanase et al. | 280/730.2 |
| 2006/0108777 A1* | 5/2006 | Mabuchi et al. | 280/730.2 |
| 2006/0175809 A1* | 8/2006 | Yamaji et al. | 280/729 |
| 2009/0072523 A1* | 3/2009 | Yokota | 280/730.2 |

FOREIGN PATENT DOCUMENTS

| | | |
|---|---|---|
| JP | A-2005-507820 | 3/2005 |
| JP | B2-4103633 | 4/2008 |

* cited by examiner

AIRBAG APPARATUS

BACKGROUND OF THE INVENTION

The present invention relates to an airbag apparatus that inflates an airbag to protect an occupant when an impact is applied to a vehicle.

As apparatuses for protecting an occupant from impact applied to a vehicle, airbag apparatuses having a gas generator (inflator) and an airbag are widely known. Such airbag apparatuses include side airbag apparatuses that protect an occupant from an impact applied to a vehicle from a side. In this type of apparatus, when an impact is applied from a side of a body side portion of a vehicle, a gas generator discharges inflation gas into the airbag. The discharged inflation gas causes the airbag to pop out forward from the seat back and to be inflated and deployed in a narrow space between the occupant seated in the vehicle seat and the body side portion. The inflated airbag reduces the impact that is transmitted from the side to the occupant through the body side portion.

In general, the lumbar region of the human body has a higher impact resistance than the shoulders and thorax. Thus, in a case of a side airbag apparatus for protecting a region including a shoulder and the lumbar region, it is preferable that the impact applied to the shoulder and thorax by the airbag be less than impact applied to the lumbar region.

For example, according to the side airbag apparatus disclosed in Japanese Patent No. 4103633, the interior of the airbag is divided into an upper inflation portion that corresponds to a shoulder and the thorax and a lower inflation portion that corresponds to the lumbar region. The upper and lower inflation portions are connected with each other by a communication passage. A cylindrical gas distributor, which encompasses a gas generator, is provided in the communication passage. The gas distributor includes an upper gas port for discharging inflation gas from the gas generator to the upper inflation portion and a lower gas port for discharging the inflation gas to the lower inflation portion. Since the lower gas port is larger than the upper gas port in this side airbag apparatus, a greater amount of inflation gas is supplied to the lower inflation portion by the gas distributor than to the upper inflation portion. Thus, the lower inflation portion is inflated at an earlier stage and by a higher internal pressure than the upper inflation portion. Accordingly, the lower inflation portion of the airbag is inflated to be relatively hard, and the upper inflation portion is inflated to be relatively soft. This allows an occupant to be effectively protected from an impact.

Further, the gas distributor of the side airbag apparatus disclosed in Japanese Patent No. 4103633 is formed of fabric. A lower portion of the gas distributor extends further downward than the lower end of the gas generator and forms a check valve. When the body of the occupant hits the lower portion of the inflated airbag, the internal pressure of the lower inflation portion is increased. When, as the result, the inflation gas starts flowing to the upper inflation portion through the gas distributor, the lower portion of the gas distributor overlaps onto itself and is closed. This restricts the flow of the inflation gas to the upper inflation portion.

However, in the above described side airbag apparatus, in which the lower portion of the cylindrical gas distributor is a check valve, parts that face the lower portion of the gas distributor are simply caused to overlap by the pressure of the inflation gas. In this case, the parts facing the gas distributor cannot be easily tightly closed without clearance, and it is therefore difficult to completely close the flow passage of the inflation gas. If the lower portion of the gas is open by the smallest degree, the inflation gas flows through the clearance.

Also, when the internal pressure of the lower inflation portion is excessively high, the lower portion of the gas distributor receives a high pressure. As a result, the lower portion of the gas distributor may be tucked inside and inverted. In this case also, the inflation gas flows to the upper inflation portion through the gas distributor. As described so far, the check valve of the side airbag apparatus disclosed in Japanese Patent No. 4103633 does not operate in a stable manner.

SUMMARY OF THE INVENTION

Accordingly, it is an objective of the present invention to provide an airbag apparatus capable of allowing a check valve to operate reliably with a simple structure.

To achieve the foregoing objective and in accordance with one aspect of the present invention, an airbag apparatus comprising an airbag and a check valve is provided. The airbag has a plurality of inflation portions inflated by inflation gas. An adjacent pair of the inflation portions are connected to each other by a communication passage formed by a pair of communication passage walls. The check valve has a pair of valve body portions provided in the communication passage. One of the inflation portions is a gas inflow inflation portion, which is inflated and deployed by a relatively high internal pressure. Another inflation portion is a gas outflow inflation portion, which is inflated and deployed by an internal pressure that is lower than that of the gas inflow inflation portion. The check valve restricts flow of the inflation gas from the gas inflow inflation portion to the gas outflow inflation portion. End portions of the valve body portions that are in the vicinity of the gas outflow inflation are each connected to corresponding one of the communication passage wall by an outflow-side joint portion extending in a direction intersecting a direction in which the inflation gas flows through the communication passage. Each valve body portion has a flexible portion that is located in the vicinity of the outflow-side joint portion and between the outflow-side joint portion and the gas inflow inflation portion. The flexible portion can be flexed toward the gas outflow inflation portion. A first edge joint portion is provided on a side edge of one of the valve body portions. The first edge joint portion is used for joining the valve body portion to the corresponding communication passage wall. A wall joint portion is provided on or in the vicinity of the first edge joint portion. The wall joint portion is used for joining the communication passage walls to each other. A second edge joint portion is provided on a side edge of the other valve body portion. The second edge joint portion is used for joining the valve body portions to each other, and the second edge joint portion extends along the flowing direction of the inflation gas. An auxiliary joint portion is provided in the vicinity of the second edge joint portion and between the first edge joint portion and the second edge joint portion. The auxiliary joint portion is used for joining the valve body portions to each other, and the auxiliary joint portion extends from the vicinity of the flexible portions toward the gas inflow inflation portion. A rigid portion, which is harder to flex than the flexible portion, is provided on or in the vicinity of the auxiliary joint portion. The rigid portion extends along the flowing direction of the inflation gas.

DETAILED DESCRIPTION OF THE PREFERRED EMBODIMENTS

First Embodiment

A side airbag apparatus according to a first embodiment of the present invention will now be described with reference to FIGS. 1 to 16. Hereinafter, the traveling direction of the vehicle is referred to as a forward direction.

Figure 1:
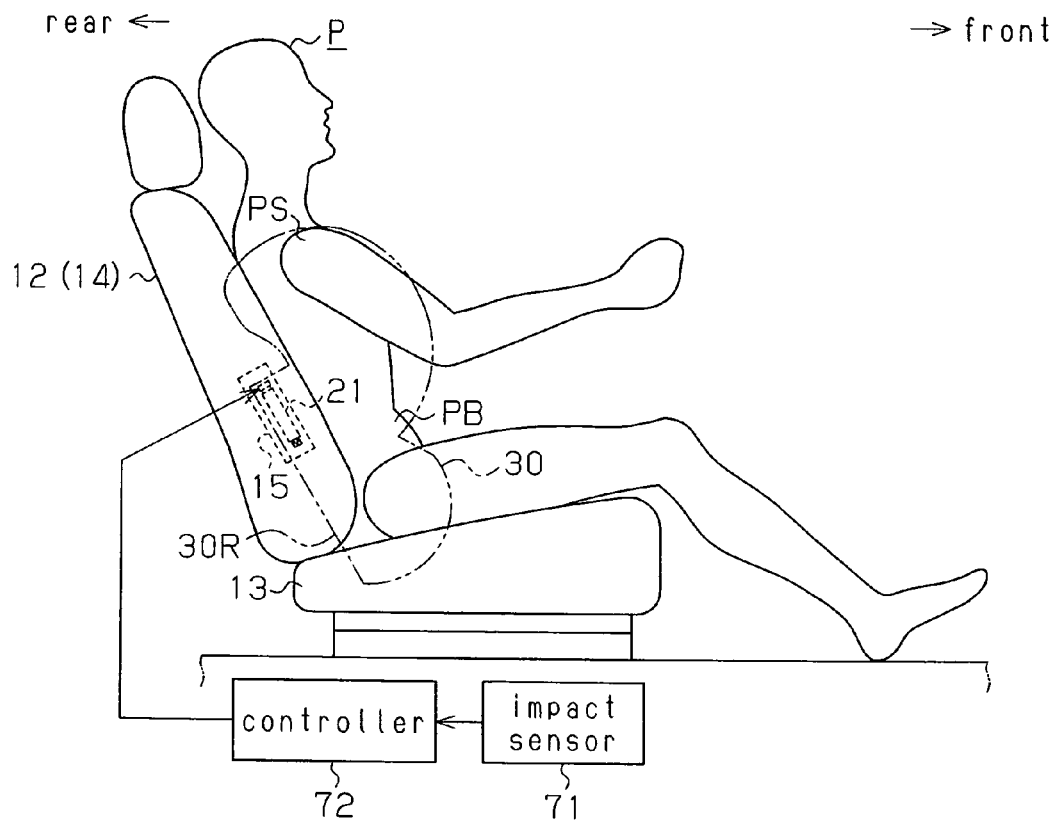
FIG. 1 is a side view illustrating a vehicle seat on which a side airbag apparatus according to a first embodiment of the present invention is mounted.
Figure 3:
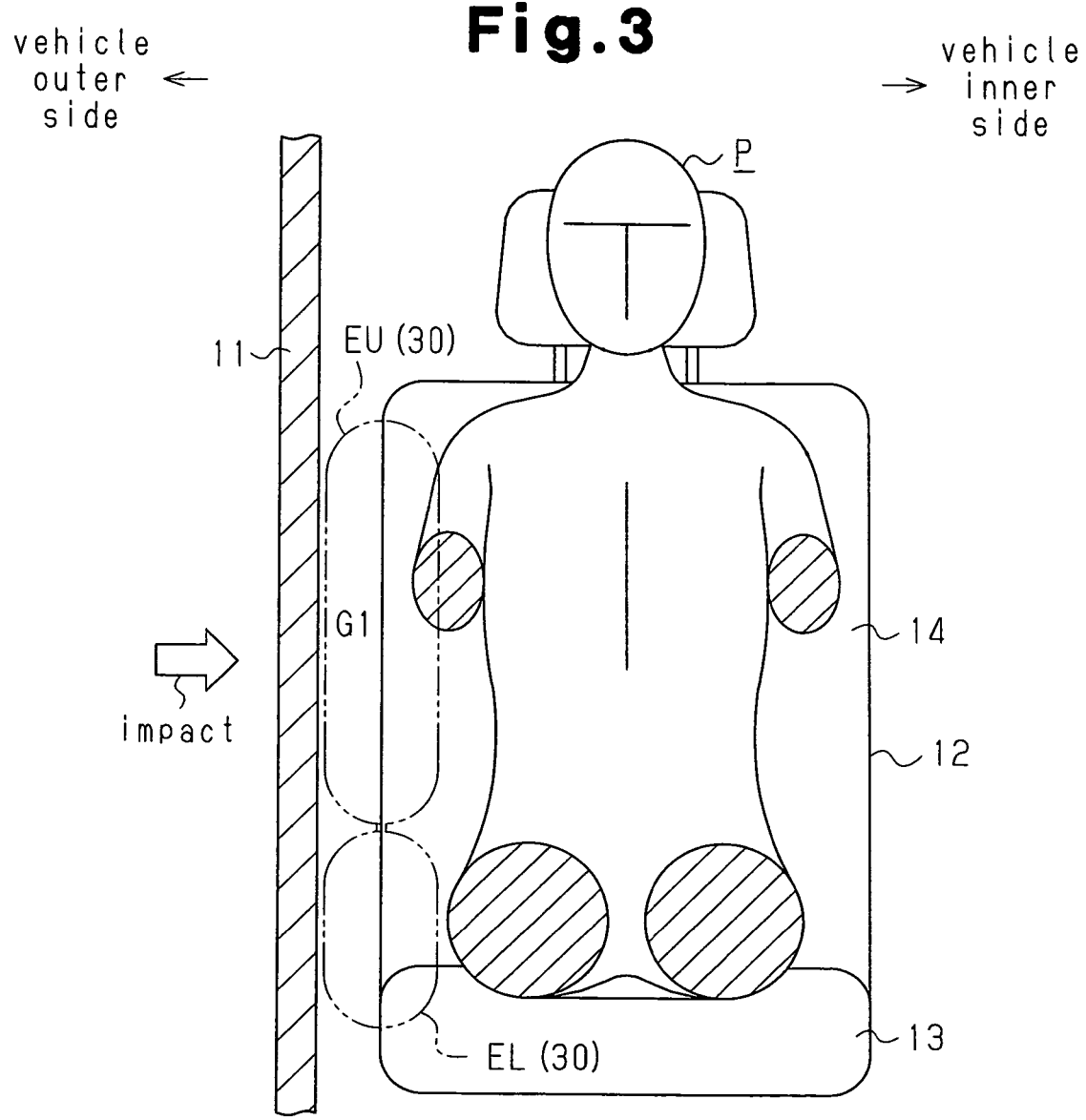
FIG. 3 is a cross-sectional front view showing the positional relationship of the vehicle seat, the occupant, and the body side portion.

As shown in FIGS. 1 and 3, a vehicle seat 12 is arranged in the vicinity of a body side portion 11 of the vehicle. The body side portion 11 refers to a member that is located at a side of the vehicle. For example, part of the body side portion 11 corresponding to the front seat includes a front door, and a center pillar (B-pillar). Part of the body side portion 11 corresponding to the rear seat includes a rear part of the side door (rear door), a rear pillar (C-pillar), a front part of the wheel well, and a rear quarter.

The vehicle seat 12 includes a seat cushion (seat portion) 13 and a seat back (backrest portion) 14. The seat back 14 extends upward from the rear end of the seat cushion 13 and includes a tilt adjusting mechanism (not shown). A storage portion 15 is provided in a side portion of the seat back 14. The storage portion 15 accommodates an airbag module AM, which forms a main part of the side impact airbag apparatus. The storage portion 15 is located diagonally behind an occupant P seated on the vehicle seat 12. The airbag module AM includes an inflator assembly 20 (see FIG. 5), which serves as a gas supply source, and an airbag 30. The airbag 30 is inflated by inflation gas G supplied by the inflator assembly 20.

The members forming the side airbag apparatus will now be described. In the present embodiment, the up-down direction and the front-rear direction are defined with reference to the seat back 14 of the vehicle seat 12. That is, the up-down direction refers to the direction along which the seat back 14 stands, and the front-rear direction refers to a direction along the thickness of the seat back 14. The seat back 14 is normally inclined rearward when used. The term "up-down direction" here is therefore not vertical, but is slightly inclined. Likewise, the front-rear direction is not strictly a horizontal direction, but is slightly inclined.

<Inflator Assembly 20>

Figure 4:
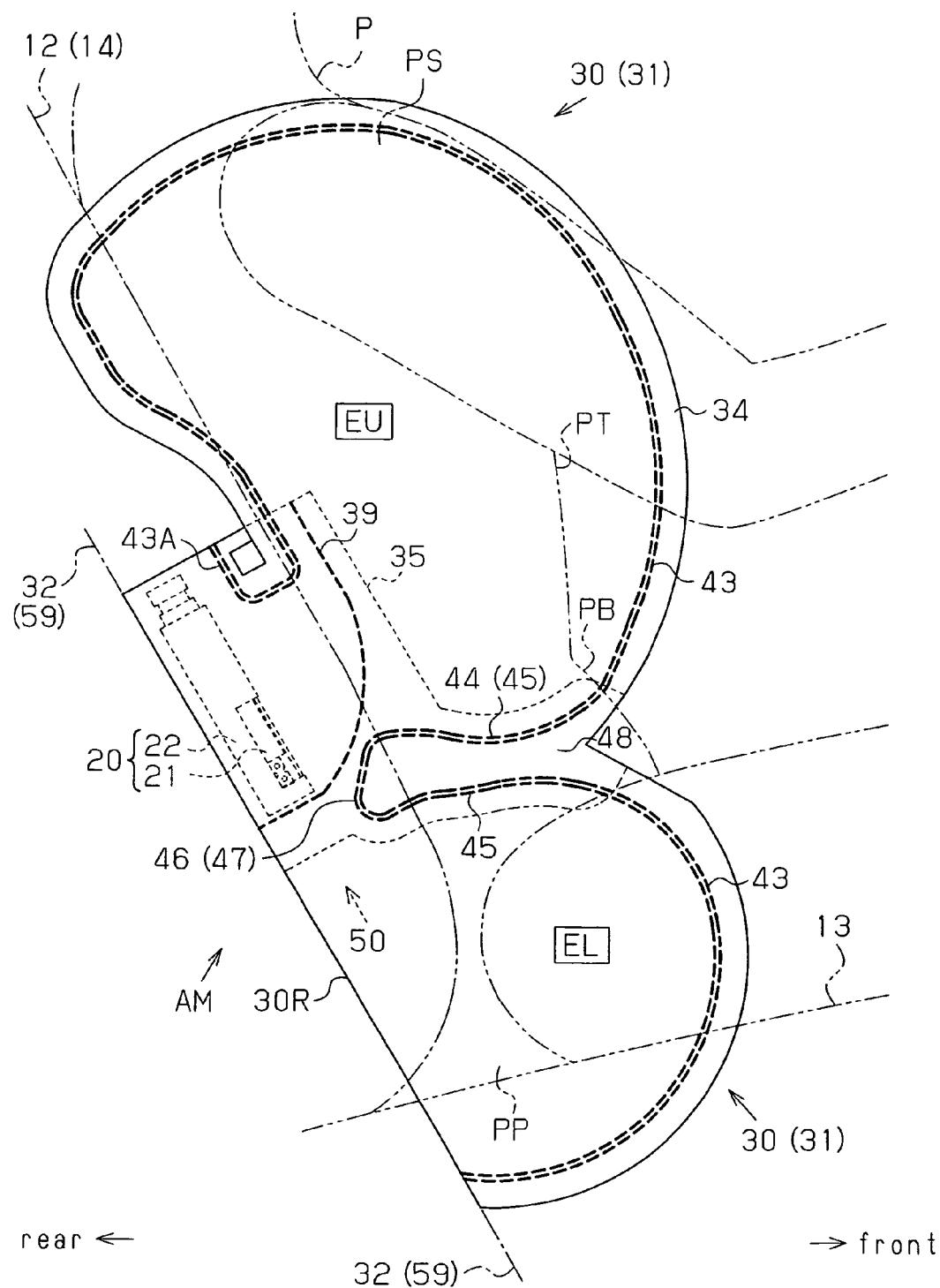
FIG. 4 is a side view illustrating an airbag module in state where the airbag is spread flat.
Figure 6:
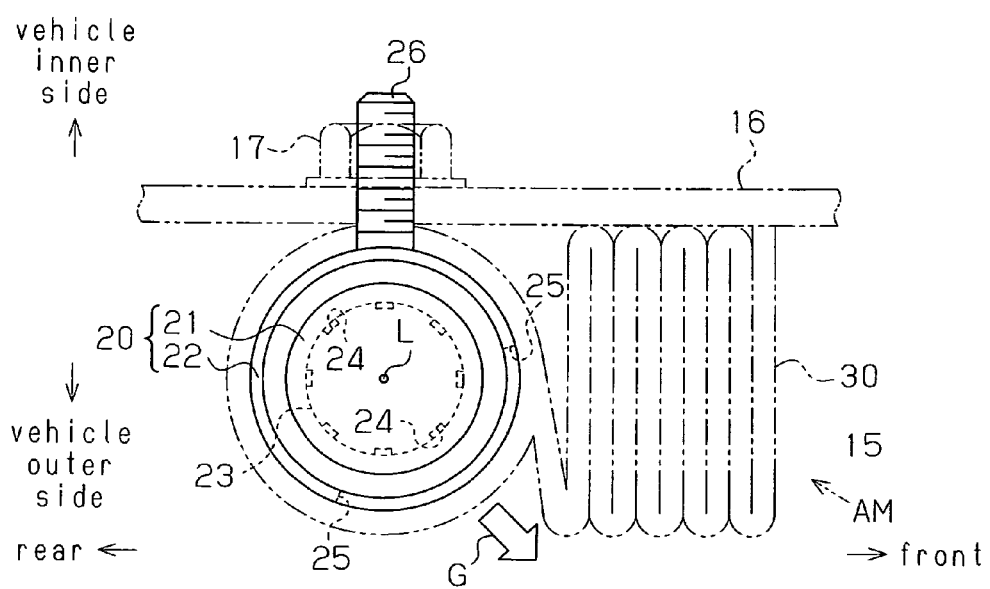
FIG. 6 is a top view illustrating an inflator assembly.

As shown in FIGS. 4 and 6, the inflator assembly 20 includes an inflator 21 and a retainer 22 that covers the inflator 21. The inflator 21 is substantially formed like a thin column extending along the up-down direction. The inflator 21 stores a gas generating agent (not shown). The gas generating agent generates the inflation gas G in response to an actuation signal from the outside.

A harness (not shown) for sending actuation signals of the inflator 21 is connected to an upper portion of the inflator 21. A substantially cylindrical gas nozzle 23 is provided in a lower portion of the inflator 21. The diameter of the gas nozzle 23 is smaller than that of the remainder of the inflator 21. A plurality of gas ports 24 are formed on the outer circumferential surface of the gas nozzle 23. The inflation gas G is discharged along a direction perpendicular to the axis L of the inflator 21, through the gas ports 24. The inflator 21 may be a type that has a compressed gas cylinder, in which a partition wall is broken with explosive to discharge inflation gas G.

Figure 5:
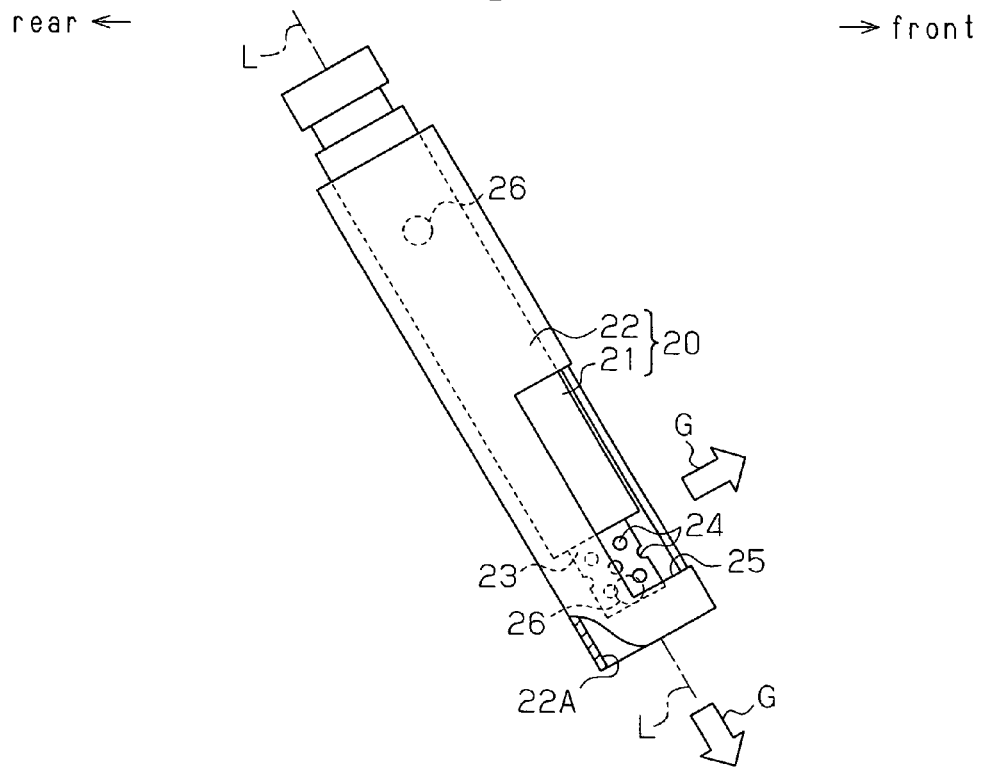
FIG. 5 is a side view illustrating an inflator assembly.

The retainer 22 functions as a diffuser. Also, the retainer 22 secures the inflator 21 to a seat frame 16 in the seat back 14 together with the airbag 30. Most of the retainer 22 is formed by bending a metal plate into a thin cylinder extending along the up-down direction. The retainer 22 has an open end 22A at the lower end. Some of the inflation gas G discharged from the gas nozzle 23 is blown through the open end 22A. FIG. 5 shows a state in which a part is cut away from the retainer 22, so that the open end 22A is visible.

The retainer 22 has a window 25 at a portion above the open end 22A and in the vicinity of the gas nozzle 23 of the inflator 21. Through the window 25, the inflation gas G discharged from the gas nozzle 23 is blown forward.

Two bolts 26 for fixing the retainer 22 to the seat frame 16 are fixed to the retainer 22. The bolts 26 are indirectly fixed to the inflator 21 by means of the retainer 22. The bolts 26 extend in a direction perpendicular to the axis L of the inflator 21. The inflator 21 and the retainer 22 of the inflator assembly 20 may be an integrated member.

<Airbag 30>

Figure 2:
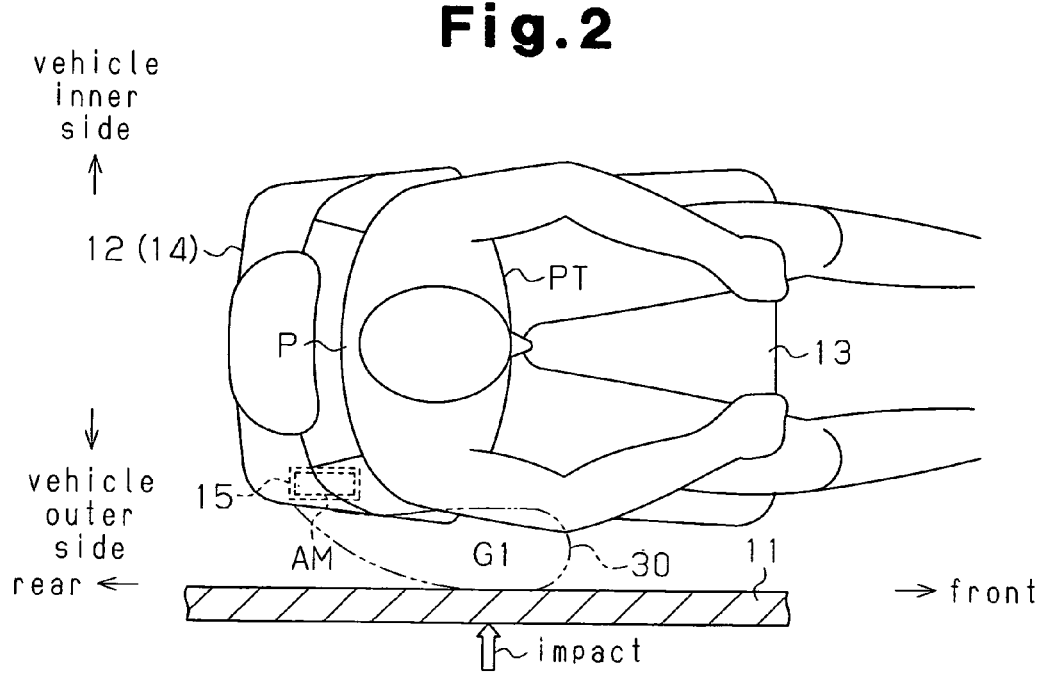
FIG. 2 is a cross-sectional plan view showing the positional relationship of the vehicle seat, the occupant, and a body side portion.

As shown in FIGS. 1 to 3, when an impact is applied to the body side portion 11 from a side, the airbag 30 is inflated and deployed by the inflation gas G from the inflator 21 (see FIGS. 5 and 6). The airbag 30 pops out toward the front of the vehicle with a part thereof retained in the storage portion 15. Thereafter, the airbag 30 is inflated and deployed in a space G1 between the vehicle seat 12 and the body side portion 11 to restraining the occupant P, thereby protecting the occupant P from the impact.

Figure 7:
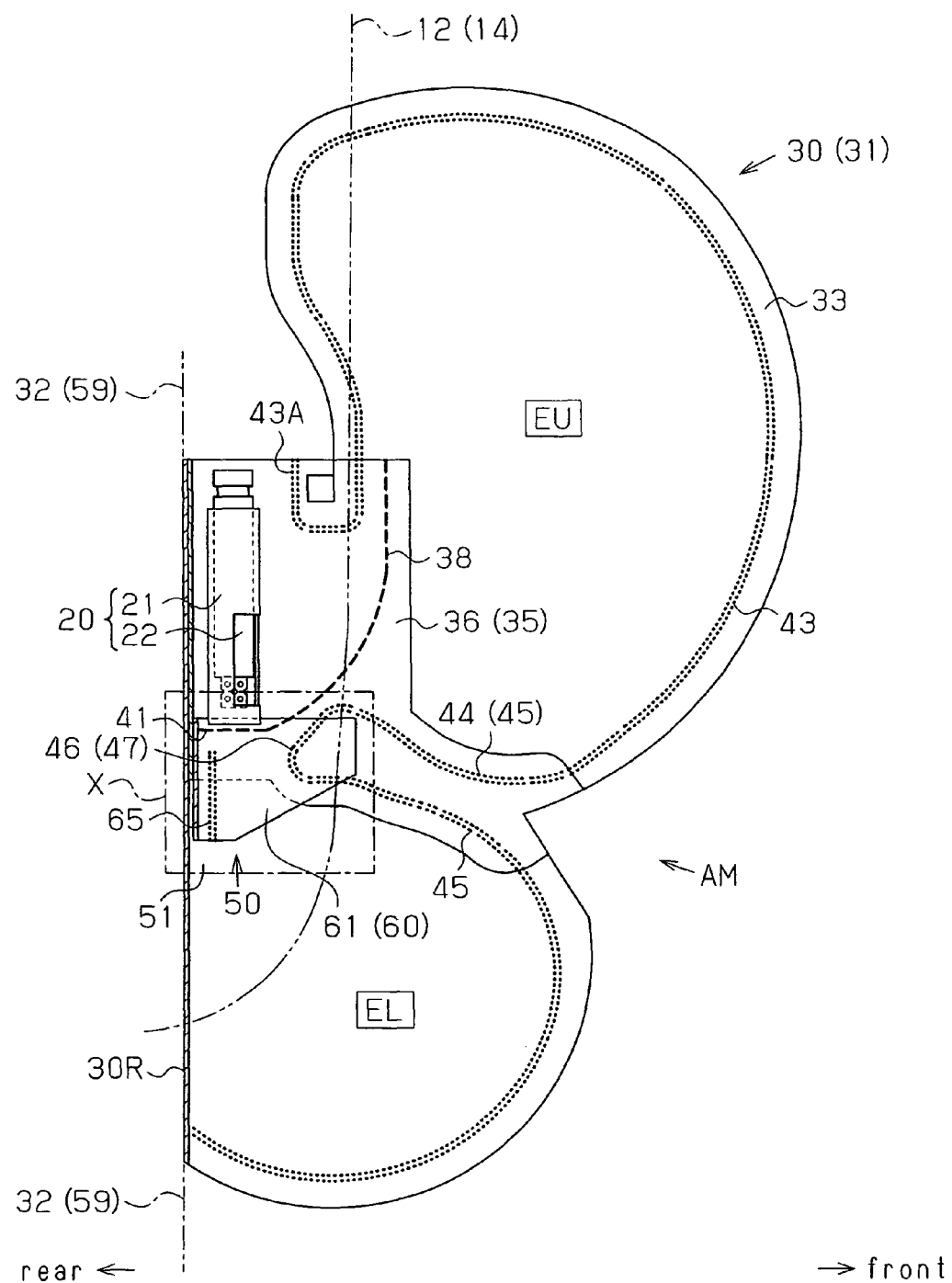
FIG. 7 is a cross-sectional view illustrating the inner structure of the airbag module.

As shown in FIGS. 4 and 7, the airbag 30 is formed by a fabric panel (ground fabric sheet) 31, which is a single fabric sheet. As the material for the fabric panel 31, a material that has a high strength and flexibility and is easy to fold is preferable. For example, woven fabric made of polyester threads or polyamide threads is suitable.

Figure 8:
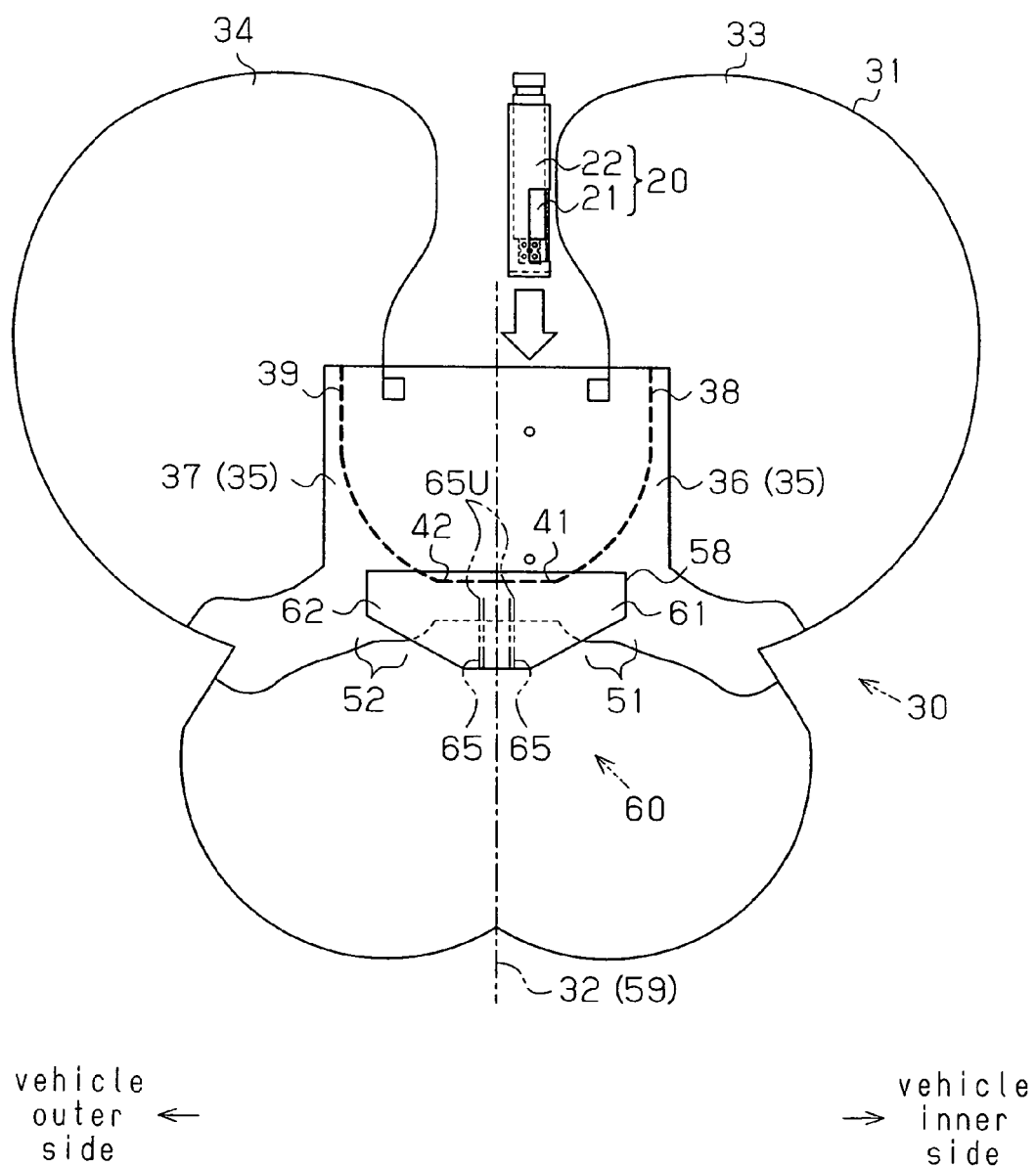
FIG. 8 is a plan view illustrating a state in which the airbag, a reinforcing fabric sheet, and a check valve are spread flat.

As shown in FIGS. 7 and 8, a folding line 32 is defined at a center of the fabric panel 31. The fabric panel 31 is folded into half at the folding line 32 so as to overlap onto itself. The rear edge 30R of the half folded airbag 30 is arranged to match the folding line 32. A part of the fabric panel 31 that is located on the vehicle inner side is referred to as a fabric portion 33, and a part located on the vehicle outer side is referred to as a fabric portion 34. The fabric portions 33, 34 are symmetrically arranged with respect to the folding line 32. The shapes and sizes of the fabric portions 33, 34 are determined to cover a wide range of the occupant P seated on the vehicle seat 12, which extends from the lumbar region PP to the thorax PT and a shoulder PS. The airbag 30 may be formed by two fabric panels.

A reinforcing fabric sheet 35 is provided at a center of the fabric panel 31 to increase the strength of the fabric portions 33, 34 against the heat of the inflation gas G. The reinforcing fabric sheet 35 spreads into the fabric portions 33, 34 with the folding line 32 as the center. The reinforcing fabric sheet 35 is formed of a single fabric sheet, and includes a fabric portion 36 located on the fabric portion 33, and a fabric portion 37 located on the fabric portion 34. The reinforcing fabric sheet 35 may be formed by two fabric sheets.

The fabric portion 36 of the reinforcing fabric sheet 35 is joined to the fabric portion 33 of the fabric panel 31 by an inner joint portion 38. Likewise, the fabric portion 37 of the reinforcing fabric sheet 35 is joined to the fabric portion 34 of the fabric panel 31 by an inner joint portion 39. When the airbag 30 and the reinforcing fabric sheet 35 are spread, the inner joint portions 38, 39 form a substantially U-shape together. The lower end of the inner joint portion 38 extends straight along the front-rear direction. The lower end of the inner joint portion 38 forms a first outflow-side joint portion 41. The lower end of the inner joint portion 39 also extends straight along the front-rear direction. The lower end of the inner joint portion 39 forms a second outflow-side joint portion 42. The first and second outflow-side joint portions 41, 42 extend in a direction substantially perpendicular to the direction in which the inflation gas G in a communication passage 50 flows (up-down direction FIGS. 7 and 8). The inner joint portion 38 is formed by sewing the fabric portions 33, 36 with sewing threads. The inner joint portion 39 is formed by sewing the fabric portions 34, 37 with sewing threads.

In FIGS. 4, 7, 8, 9, 12 to 16, 22, 23, 24, and 25, the thick dashed lines represent sewing threads on the outer surface of the fabric, and the dotted lines represent sewing threads on the inner surface of the fabric, that is, the sewing threads between fabric sheets. That is, the drawings showing the latter are cross-sectional views taken along a plane including sewn parts. The inner joint portions 38, 39 may be formed by adhesive. This applies to the elements that will be discussed below, including a peripheral joint portion 43, a dividing joint portion 44, the inner joint portions 38, 39, the outflow-side joint portions 41, 42, a wall joint portion 63, a first edge joint portion 67, an auxiliary joint portion 69, and rigid portions 65.

As shown in FIGS. 4 and 7, the fabric portions 33, 36 and the fabric portions 34, 37 are joined by the peripheral joint portion 43 located at the periphery except for their rear edges. Portions of the fabric portion 33, 36 and the fabric portions 34, 37 that are encompassed by the peripheral joint portion 43 are inflated by the inflation gas G.

The fabric portions 33, 34 of the fabric panel 31 and the fabric portions 36, 37 of the reinforcing fabric sheet 35 are joined to each other by the dividing joint portion 44, which is a part of the peripheral joint portion 43. The dividing joint portion 44 divides the airbag 30 into a lower inflation portion having a relatively small volume and an upper inflation portion having a volume greater than that of the lower inflation portion. The dividing joint portion 44 includes a pair of extensions 45 and a connecting portion 46 that connects the rear ends of the extensions 45. The extensions 45 are separated from each other and extend rearward from the front ends of the fabric portions 33, 34, 36, 37. The connecting portion 46 includes a projection 47 projecting rearward. Further, the fabric portions 33, 36 on the vehicle inner side and the fabric portions 34, 37 on the vehicle outer side are joined to each other by a rear portion 43A of the peripheral joint portion 43.

An inflation portion below the dividing joint portion 44 is formed as a lower inflation portion EL that is inflated and deployed by a relatively high internal pressure to restrain and protect the lumbar region PP of the occupant P. Also, an inflation portion above the dividing joint portion 44 is formed as an upper inflation portion EU that is inflated and deployed by an internal pressure lower than that of the lower inflation portion EL to protect the thorax PT of the occupant P, more specifically, to protect a part from the abdomen PB to the shoulder PS. The lower inflation portion EL is a gas inflow inflation portion, and the upper inflation portion EU is a gas outflow inflation portion.

The connecting portion 46 is located forward of the rear edge 30R of the airbag 30. The communication passage 50 is located in the airbag 30 to connect the lower inflation portion EL and the upper inflation portion EU to each other, and to allow the inflation gas G to flow therethrough. The communication passage 50 is formed by a space that is located between the fabric portions 33, 36 on the vehicle inner side and the fabric portions 34, 37 on the vehicle outer side, and between the rear edge 30R and the connecting portion 46. Parts of the fabric portions 33, 36 on the vehicle inner side that form the communication passage 50 are defined as a first communication passage wall 51, and parts of the fabric portions 34, 37 on the vehicle outer side that form the communication passage 50 are defined as a second communication passage wall 52 (see FIGS. 8 and 11). The first and second communication passage walls 51, 52 are flat and laid on top of each other when the airbag 30 is not inflated.

Figure 9:
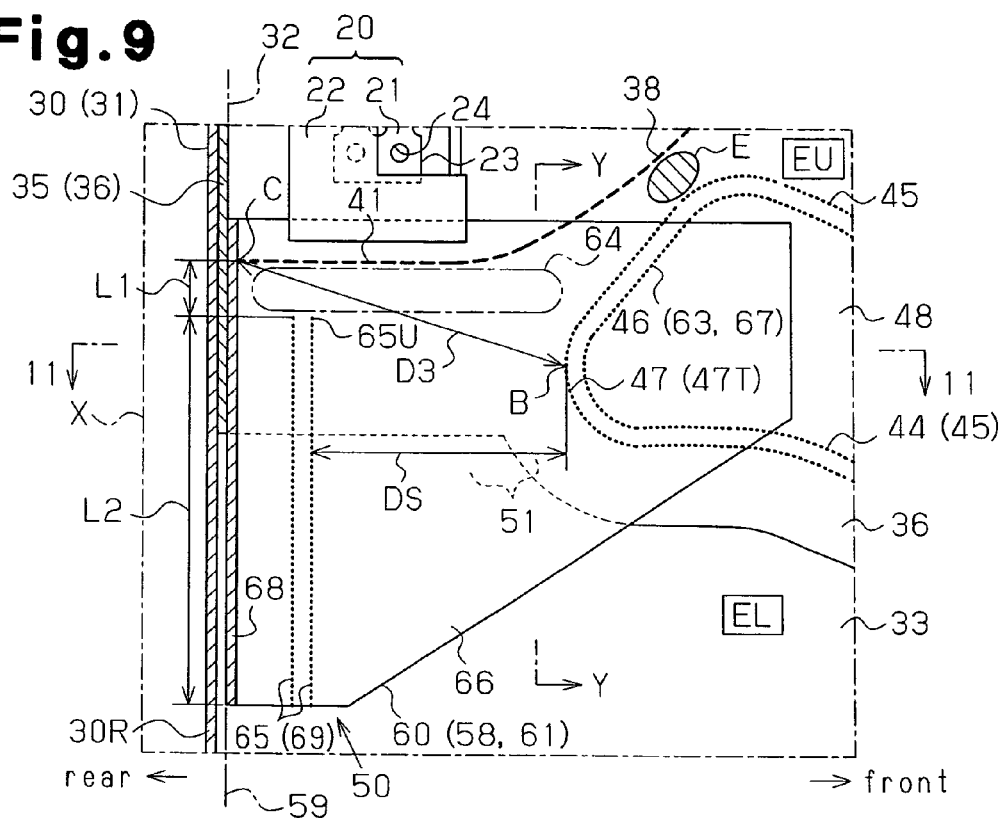
FIG. 9 is an enlarged cross-sectional view illustrating region X of FIG. 7.

As shown in FIG. 9, in the communication passage 50, the distance between the rear edge 30R and the connecting portion 46 of the airbag 30 is smallest at a distal end 47T of the projection 47. The peripheral joint portion 43 including the dividing joint portion 44 is formed by sewing the fabric portions 33, 36 on the vehicle inner side and the fabric portions 34, 37 on the vehicle outer side with sewing threads. A portion of the airbag 30 that is surrounded by the upper and lower extensions 45 and the connecting portion 46 is a non-inflation portion 48, which is not inflated.

<Mounting of Inflator Assembly 20 to Airbag 30>

As shown in FIG. 4, the inflator assembly 20 is provided in the airbag 30 at a position in the vicinity of the communication passage 50, while being inclined to be lower toward the front end. The lower end of the inflator assembly 20 is located rearward of the connecting portion 46. Most of the inflator assembly 20 is located above the connecting portion 46.

Figure 10:
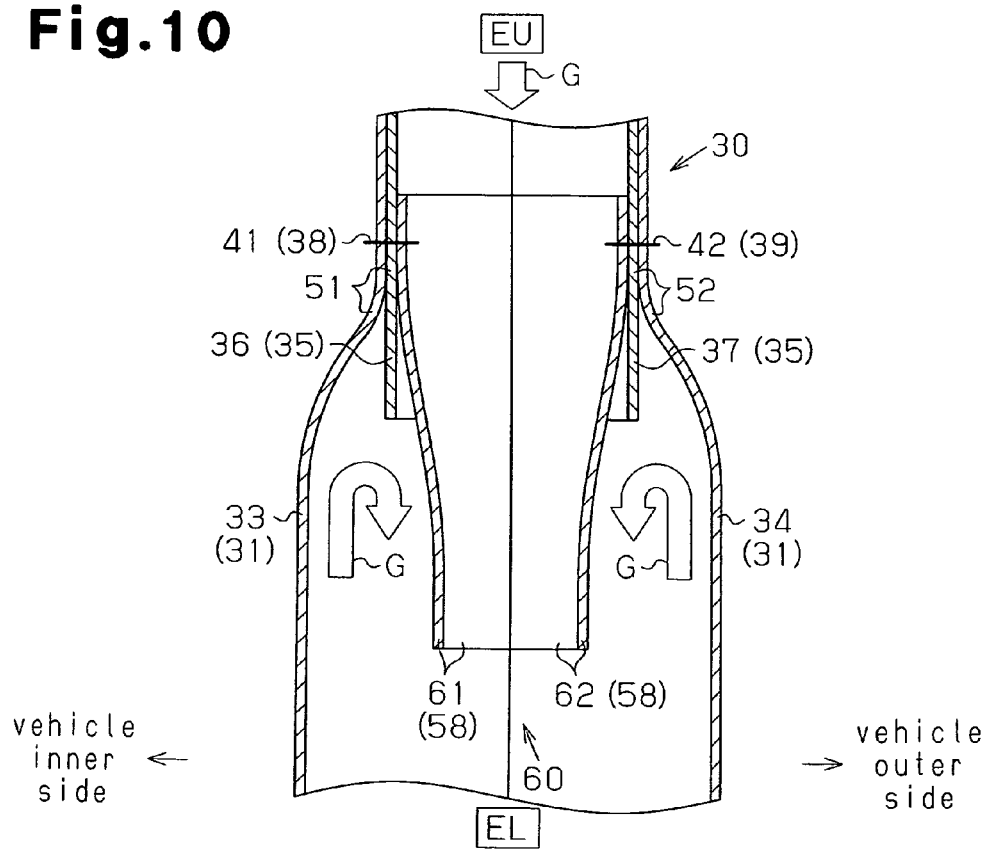
FIG. 10 is a partial cross-sectional view illustrating the check valve at an early stage of inflation of the airbag.
Figure 11:
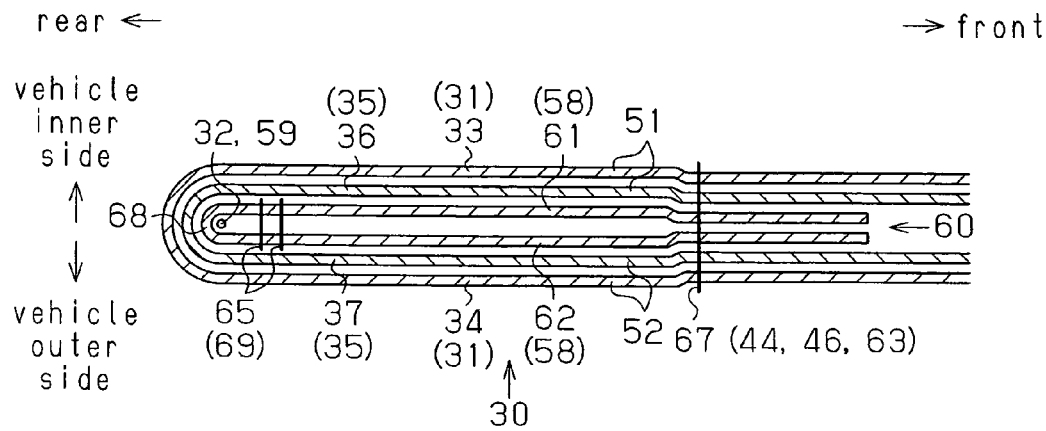
FIG. 11 is a cross-sectional view taken along line 11-11 of FIG. 9.

The bolts 26 fixed to the retainer 22 are inserted into the rear portions of the fabric portions 33, 36 on the vehicle inner side (see FIGS. 5 and 6). A part in the vicinity of the peripheral joint portion 43A of the airbag 30 is airtightly fastened to the upper end of the inflator assembly 20 by an annular fastening tool (not shown) attached to the outside of the airbag 30. As shown in FIGS. 9 to 11, the communication passage 50 includes a check valve 60, which restricts the flow of the inflation gas G from the lower inflation portion EL to the upper inflation portion EU.

<Check Valve>

As shown in FIGS. 7 and 8, the check valve 60 is formed by a single fabric sheet 58. The fabric sheet 58 is arranged to spread into the fabric portions 33, 34, 36, 37 of the fabric panel 31 and the reinforcing fabric sheet 35 with the folding line 32 as the center. A folding line 59 is formed in a center portion of the fabric sheet 58. The fabric sheet 58 is folded in the middle along the folding lines 32, 59 with the fabric panel 31 and the reinforcing fabric sheet 35, while matching the folding line 59 with the folding line 32 of the fabric panel 31. A part of the fabric sheet 58 that is located on the vehicle inner side is referred to as a first valve body portion 61, and a part of the fabric sheet 58 that is located on the vehicle outer side is referred to as a second valve body portion 62. The check valve 60 is formed by a pair of the valve body portions 61, 62.

The valve body portions 61, 62 are joined to the reinforcing fabric sheet 35 and the airbag 30 by using parts of the inner joint portions 38, 39 and a part of the dividing joint portion 44. The lower end of the inner joint portion 38, which is used for joining the first valve body portion 61 to the reinforcing fabric sheet 35 and the airbag 30, is the first outflow-side joint portion 41, which extends along the front-rear direction, which is substantially perpendicular to the flowing direction of the inflation gas G through the communication passage 50. Likewise, the lower end of the inner joint portion 39, which is used for joining the second valve body portion 62 to the reinforcing fabric sheet 35 and the airbag 30 is the second outflow-side joint portion 42, which extends along the front-rear direction, which is substantially perpendicular to the flowing direction of the inflation gas G through the communication passage 50.

The upper end of the first valve body portion 61 is joined to the first communication passage wall 51 by the first outflow-side joint portion 41 on the vehicle inner side. The upper end of the second valve body portion 62 is joined to the second communication passage wall 52 by the outer second outflow-side joint portion 42. In this case, the first outflow-side joint portion 41 is formed by sewing the first valve body portion 61 of the check valve 60 and the fabric portion 36 of the reinforcing fabric sheet 35 to the fabric portion 33 of the fabric panel 31. Also, the second outflow-side joint portion 42 is formed by sewing the second valve body portion 62 of the check valve 60 and the fabric portion 37 of the reinforcing fabric sheet 35 to the fabric portion 34 of the fabric panel 31. The upper end of the first valve body portion 61 and the upper end of the second valve body portion 62 are not joined to each other.

The dividing joint portion 44, which is used for joining the valve body portions 61, 62 to the reinforcing fabric sheet 35 and the airbag 30, is mainly formed by the connecting portion 46. The connecting portion 46 also functions as the first edge joint portion 67 and the wall joint portion 63. The first edge joint portion 67 joins the front edges of the valve body portions 61, 62 to the corresponding communication passage walls 51, 52. The wall joint portion 63 joins the communication passage walls 51, 52 to each other on the first edge joint portion 67 or in the vicinity thereof. To simultaneously maintain these functions, the connecting portion 46 joins the valve body portions 61, 62 to the communication passage walls 51, 52 of the airbag 30 and the reinforcing fabric sheet 35. In this case, the dividing joint portion 44 is formed by sewing the airbag 30, the reinforcing fabric sheet 35, and the check valve 60.

The valve body portions 61, 62 each have a flexible portion 64, which is easily flexed toward the upper inflation portion EU by the pressure of the inflation gas G. The flexible portions 64 are located between the outflow-side joint portions 41, 42 and the lower inflation portion EL and in the vicinity of the outflow-side joint portions 41, 42. The flexible portions 64 are located in a region between the outflow-side joint portions 41, 42 and a position separated downward from outflow-side joint portions 41, 42 by a distance L1. Specifically, each flexible portion 64 is a region surrounded by an alternate long and short dash line in FIG. 9.

The rear portions of the valve body portions 61, 62 are joined together by a second edge joint portion 68. The second edge joint portion 68 extends along the flowing direction of the inflation gas G in the communication passage 50. In the present embodiment, the second edge joint portion 68 is formed by a folded back portion of the single fabric sheet 58 forming the first and second valve body portions 61, 62, specifically, by the folding line 59 and the region in its vicinity.

Further, the rigid portions 65 are formed at the rear portion of each of the valve body portions 61, 62, more specifically, at positions slightly forward of the folding line 59 of the fabric sheet 58. The rigid portions 65 extend from the vicinity of the lower end of the flexible portions 64 toward the lower inflation portion EL at the rear portions of the valve body portions 61, 62. The vicinity of the lower ends of the flexible portions 64 include a position that is separated downward from the outflow-side joint portions 41, 42 by the distance L1. The rigid portions 65 are formed by sewing the valve body portions 61, 62 with sewing threads in a single or multiple rows. The rigid portions 65 are more rigid and harder to flex than the flexible portions 64, the outflow-side joint portions 41, 42, the first edge joint portion 67, and the wall joint portion 63.

The rigid portions 65 also function as the auxiliary joint portion 69. The auxiliary joint portion 69 is located between the first edge joint portion 67 and the second edge joint portion 68, and in the vicinity of the second edge joint portion 68. The auxiliary joint portion 69 joins the first valve body portion 61 and the second valve body portion 62 to each other. The auxiliary joint portion 69 extends toward the lower inflation portion EL from the vicinity of the lower ends of the flexible portions 64, that is, from a position separated from the outflow-side joint portions 41, 42 by the distance L1.

As described above, in the communication passage 50, the distance between the rear edge 30R and the connecting portion 46 of the airbag 30 is smallest at the distal end 47T of the projection 47. Accordingly, the distance (flow passage area DS of the inflation gas G) between the first edge joint portion 67 (the wall joint portion 63) and the rigid portions 65 (the auxiliary joint portion 69) is the smallest at the distal end 47T of the projection 47.

The rigid portions 65 prevent the upper ends of the communication passage walls 51, 52 and the upper ends of the valve body portions 61, 62 from opening. In this case, the upper ends of the communication passage walls 51, 52 and the valve body portions 61, 62 are more restricted as the upper ends 65U of rigid portions 65 approach the outflow-side joint portions 41, 42, or as the rigid portions 65 approach the distal end 47T of the projection 47. Therefore, the upper ends 65U of the rigid portions 65 are at positions where they do not significantly hinder the opening of the upper ends of the communication passage walls 51, 52 and the valve body portions 61, 62.

Figure 12:
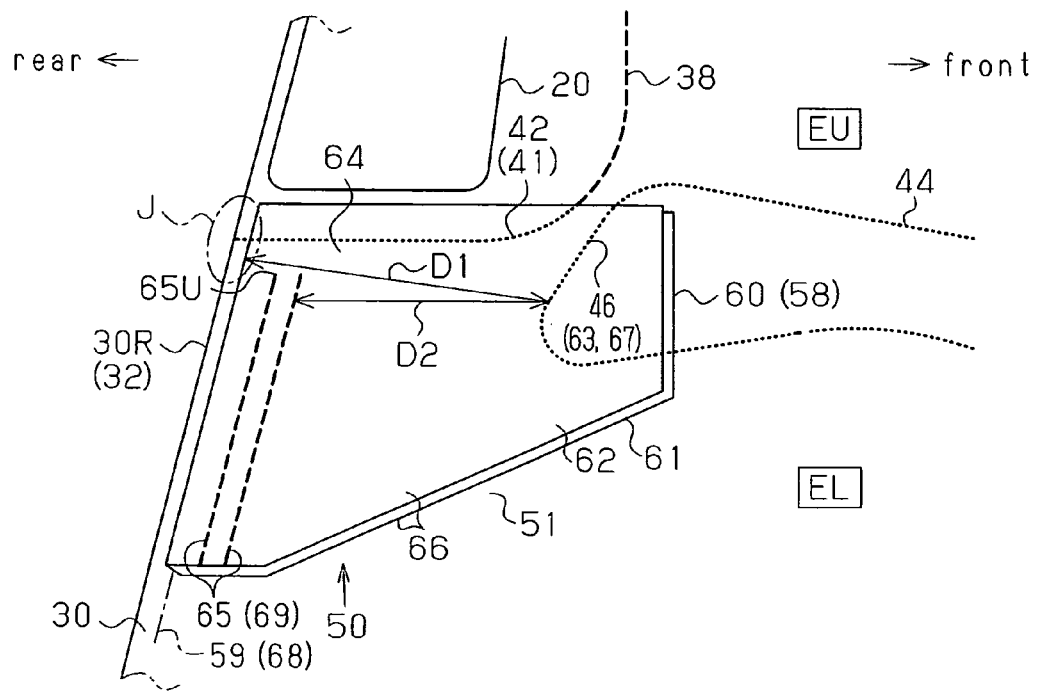
FIG. 12 is a diagram showing the check valve in a state before receiving inflation gas from the inflator.

As shown in FIG. 12, the rigid portions 65 of the check valve 60 are separated forward from the folding line 59 (the second edge joint portion 68) of the fabric sheet 58. Therefore, the distance D1 between the folding line 59 and the wall joint portion 63 is greater than the distance between the rigid portions 65 and the wall joint portion 63. Accordingly, when the inflation gas G flows between the valve body portions 61, 62 so that the check valve 60 is opened to be cylindrical, the region between the rigid portions 65 and the wall joint portion 63 has a smaller diameter than the region between the second edge joint portion 68 and the wall joint portion 63.

As shown in FIG. 9, the length of the rigid portions 65 is represented by L2. In the wall joint portion 63, the distance between a spot B (the distal end 47T of the projection 47) at which the distance from the rigid portions 65 is the smallest and ends C of the outflow-side joint portions 41, 42 is represented by D3. In the present embodiment, the expression L2>D3 is satisfied.

At the lower portion of each of the valve body portions 61, 62, an inclined portion 66, which is inclined to be higher toward the front end, is provided. At the inclined portions 66, the valve body portions 61, 62 are not joined together. The upper end of the first valve body portion 61 is joined to the first communication passage wall 51 (the fabric portions 33, 36 on the vehicle inner side), and the upper end of the second valve body portion 62 is joined to the second communication passage wall 52 (the fabric portions 34, 37 on the vehicle outer side). However, the upper ends of the first and second valve body portions 61, 62 are not joined to each other. Therefore, the upper end of the check valve 60 and the inclined portions 66 can open to be cylindrical when the inflation gas G is supplied.

As shown in FIG. 10, the first valve body portion 61 of the check valve 60 is joined to the fabric portions 33, 36 by means of the first outflow-side joint portion 41. Thus, the inflation gas G does not flow between the lower inflation portion EL and the upper inflation portion EU through between the first valve body portion 61 and the fabric portions 33, 36. The second valve body portion 62 of the check valve 60 is joined to the fabric portions 34, 37 by means of the second outflow-side joint portion 42. Thus, the inflation gas G does not flow between the lower inflation portion EL and the upper inflation portion EU through between the second valve body portion 62 and the fabric portions 34, 37. That is, the inflation gas G can flow between the lower inflation portion EL and the upper inflation portion EU only through between the valve body portions 61, 62.

As shown in FIG. 9, a spot E, which is held between the inner joint portion 38 and the connecting portion 46, is located between the first valve body portion 61 and the fabric portion 33. Although the inflation gas G can flow through the spot E, the inflation force of the upper inflation portion EU causes the first valve body portion 61 to close contact the fabric portion 33. Thus, the inflation gas G hardly flows through the portion E. A spot held between the inner joint portion 39 and the connecting portion 46 exists between the second valve body portion 62 and the fabric portion 34. However, the inflation gas G hardly flows through the spot.

The inner joint portion 38 and the connecting portion 46 may be sewn to intersect each other. In this case, since the spot E, which functions as a flow passage of the inflation gas G, is formed, above described problems do not occur.

As shown in FIG. 9, the upper ends of the valve body portions 61, 62 are located behind the dividing joint portion 44, and face the upper inflation portion EU. Also, the inclined portions 66 of the valve body portions 61, 62 are located in an upper portion of the lower inflation portion EL and rearward of the dividing joint portion 44. The lower end of the retainer 22 is tucked into the check valve 60.

As shown in FIG. 6, the airbag module AM is made compact (storage state) by folding the airbag 30 in a spread state (see FIG. 4). The airbag 30 is folded in this manner in order that the airbag module AM can be readily stored in the narrow storage portion 15 in the seat back 14 (see FIGS. 1 and 2).

The bolts 26 passed through the airbag 30 and the reinforcing fabric sheet 35 are passed through the seat frame 16. A nut 17 is screwed onto each bolt 26, so that the airbag module AM in the storage state is fastened to the seat frame 16. The retainer 22 may be fixed to the vehicle (the seat frame 16) by means of members other than the bolts 26.

As shown in FIG. 1, the side airbag apparatus includes an impact sensor 71 and a controller 72. The impact sensor 71 is configured by, for example, an acceleration sensor, and is attached to the body side portion 11, so as to detect an impact applied to the body side portion 11 from the side. The controller 72 controls the operation of the inflator 21 based on a detection signal from the impact sensor 71.

The operation of the side airbag apparatus as described above will now be described wither reference to FIGS. 12 to 16. FIGS. 12 to 16 show changes in shape of the check valve 60 caused by supply of the inflation gas G and stop of the supply. In FIGS. 12 to 16, the dividing joint portion 44 is represented by a single broken line. Also, as indicated by frame J of an alternate long and short dash line, the folding line 32 of the airbag 30 and the folding line 59 of the check valve 60 are shown to be separate from each other in the vicinity of the rigid portions 65 of the outflow-side joint portions 41, 42. However, the folding lines 32, 59 are actually match with each other. Therefore, the inflation gas G does not leak between the rear end of the airbag 30 and the rear end of the check valve 60.

In the side airbag apparatus, as long as no impact is applied to the vehicle from a side, the airbag 30 is stored in the storage portion 15 with the inflator assembly 20, while remaining in the storage state. At this time, the first valve body portion 61 and the second valve body portion 62 overlap onto one another.

When the impact sensor 71 detects that an impact the magnitude of which is greater than or equal to a predetermined value is applied to the body side portion 11 while the vehicle is moving, the controller 72 outputs an actuation signal to the inflator 21. In response to the actuation signal, the gas generating agent in the inflator 21 generates high temperature and pressure inflation gas G. The inflation gas G is discharged along a direction perpendicular to the axis L of the inflator 21, through the gas ports 24 of the gas nozzle 23. Some of the inflation gas G flows to the upper inflation portion EU through the window 25 of the retainer 22. Accordingly, the inflation of the upper inflation portion EU is initiated.

On the other hand, some of the inflation gas G flows to the lower inflation portion EL through the open end 22A of the retainer 22. In this case, the space between the inflator 21 and the parts of the retainer 22 other than the window 25 serves as a passage for the inflation gas G discharged from the gas ports 24. The direction of the inflation gas G blown out from the gas ports 24 is changed to the axial direction of the inflator 21 (upward and downward) after the gas G hits the retainer 22. However, a portion of the inflator 21 above the gas nozzle 23 has a diameter greater than that of the gas nozzle 23. That is, the space between the inflator 21 and the retainer 22 is smaller than the space between the gas nozzle 23 and the retainer 22. Therefore, the inflation gas G is hard to flow upward but easily flows downward. Thus, most of the inflation gas G that hit the retainer 22 flows into the check valve 60 through the open end 22A of the retainer 22.

Figure 13:
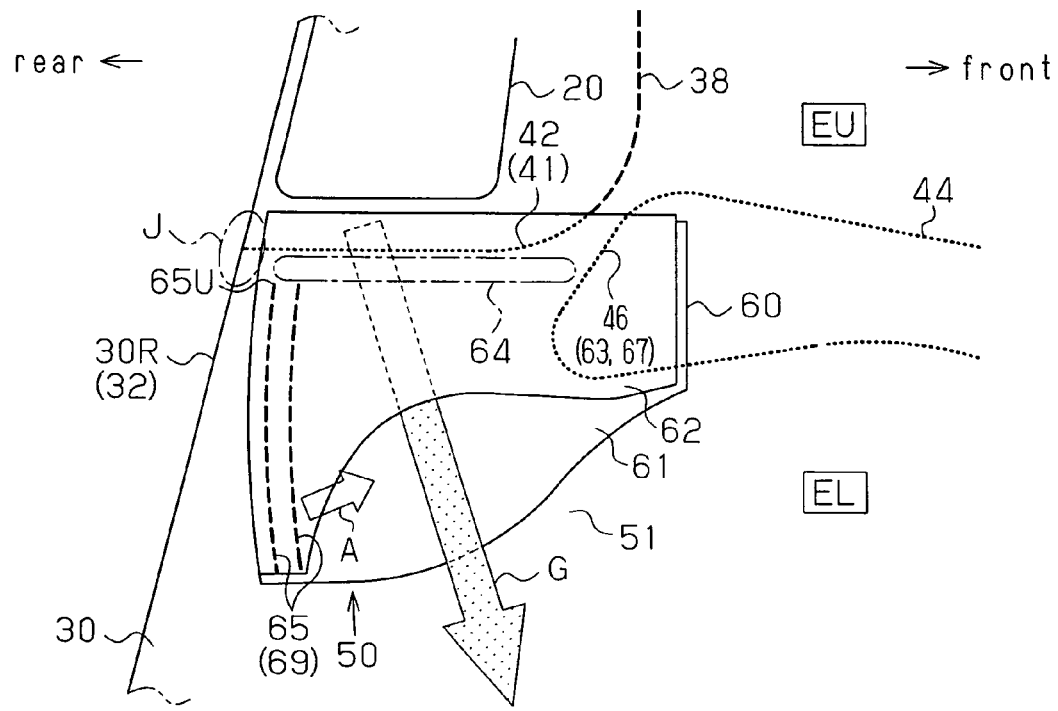
FIG. 13 is a diagram showing the check valve in a state when receiving inflation gas from the inflator.

As shown in FIG. 13, the first and second valve body portions 61, 62 are inflated to be cylindrical while the inflation gas G is supplied to the check valve 60. This is because the upper end of the first valve body portion 61 is joined to the first communication passage wall 51, and the upper end of the second valve body portion 62 is joined to the second communication passage wall 52 (see FIGS. 8 and 10). Also, another reason for the cylindrical inflation of the first and second valve body portions 61, 62 is that the front edges of the valve body portions 61, 62 are joined to the corresponding communication passage walls 51, 52 by the first edge joint portion 67. Further, the cylindrical inflation is also attributed to the fact that the rear ends of the valve body portions 61, 62 are joined together by the auxiliary joint portion 69.

When the valve body portions 61, 62 are inflated to be cylindrical, the flexible portions 64 and a portion below of have different inner diameters. Also, in the check valve 60, the auxiliary joint portion 69 is separated forward from the second edge joint portion 68. Therefore, in each flexible portion 64, the distance D1 between the second edge joint portion 68 and the first edge joint portion 67 is greater than the distance D2 between the rigid portions 65 and the first edge joint portion 67 (see FIG. 12). Thus, portions of the valve body portions 61, 62 that are below the flexible portions 64 act to inflate to be cylindrical with an inner diameter smaller than that of the flexible portions 64.

However, although the front edges of the valve body portions 61, 62 are joined to the corresponding communication passage walls 51, 52, whereas the rear ends of the valve body portions 61, 62 are joined to the auxiliary joint portion 69, the communication passage walls 51, 52 are not joined to each other. Therefore, although the front edges of the valve body portions 61, 62 are fixed to the communication passage walls 51, 52, the rear ends of the valve body portions 61, 62 can move freely in relation to the communication passage walls 51, 52. Also, in the valve body portions 61, 62, the rigid portions 65 are rigid and hard to flex, but the flexible portions 64 are soft and easy to flex.

Therefore, the flexible portions 64 of the valve body portions 61, 62 act to inflate to be cylindrical with a large inner diameter, and the lower part below the flexible portions 64 expands to be cylindrical with a small diameter. Thus, the flexible portions 64 are flexed toward the upper inflation portion EU. Accordingly, as indicated by arrow A in FIG. 13, portions of the valve body portions 61, 62 that are below the flexible portions 64 are pulled toward the outflow-side joint portions 41, 42 and the wall joint portion 63 about a region in the vicinity of the upper ends 65U of the rigid portions 65 (a spot encompassed by frame F of an alternate long and short dash line in FIG. 14). As a result, the rigid portions 65 are inclined to be forward toward the lower end. At this time, the portions between the wall joint portion 63 and the rigid portions 65 are likely to be wrinkled.

The inflation gas G passes through the cylindrically inflated check valve 60 and flows into the lower inflation portion EL. The inflation gas G starts the inflation of the lower inflation portion EL. As the upper inflation portion EU and the lower inflation portion EL are inflated, the airbag 30 is unfolded in reverse order to the order when folded.

The airbag 30 pops out forward with a part thereof remaining in the storage portion 15 of the seat back 14, and is inflated between the body side portion 11 and the vehicle seat 12, while being deployed. As shown in FIGS. 3 and 4, when the airbag 30 is inflated and deployed, the upper inflation portion EU is inflated and deployed between the body side portion 11 and the thorax PT of the occupant P seated on the vehicle seat 12. Also, the lower inflation portion EL is inflated and deployed between the body side portion 11 and the lumbar region PP of the occupant P. The body parts of the occupant P are restrained by the inflation portions EU, EL of the airbag 30. In this manner, the occupant P is protected from the impact of a side collision.

The internal pressure of the upper inflation portion EU starts increasing after the internal pressure of the inner inflation portion EL starts increasing, due to difference in the flow rate and volume of the inflation gas G supplied by the inflator 21. At an early stage of the inflation of the airbag 30, the internal pressure of the upper inflation portion EU is lower than the internal pressure of the lower inflation portion EL. As a result, the lumbar region PP, which has a high impact resistance, is restrained and protected by the lower inflation portion EL, of which the internal pressure is high. Also, the thorax PT, which has a low impact resistance, is softly restrained and protected by the upper inflation portion EU, of which the internal pressure is low. As a result, the impact applied to the occupant P by the airbag 30 is smaller at the thorax PT than at the lumbar region PP.

Figure 14:
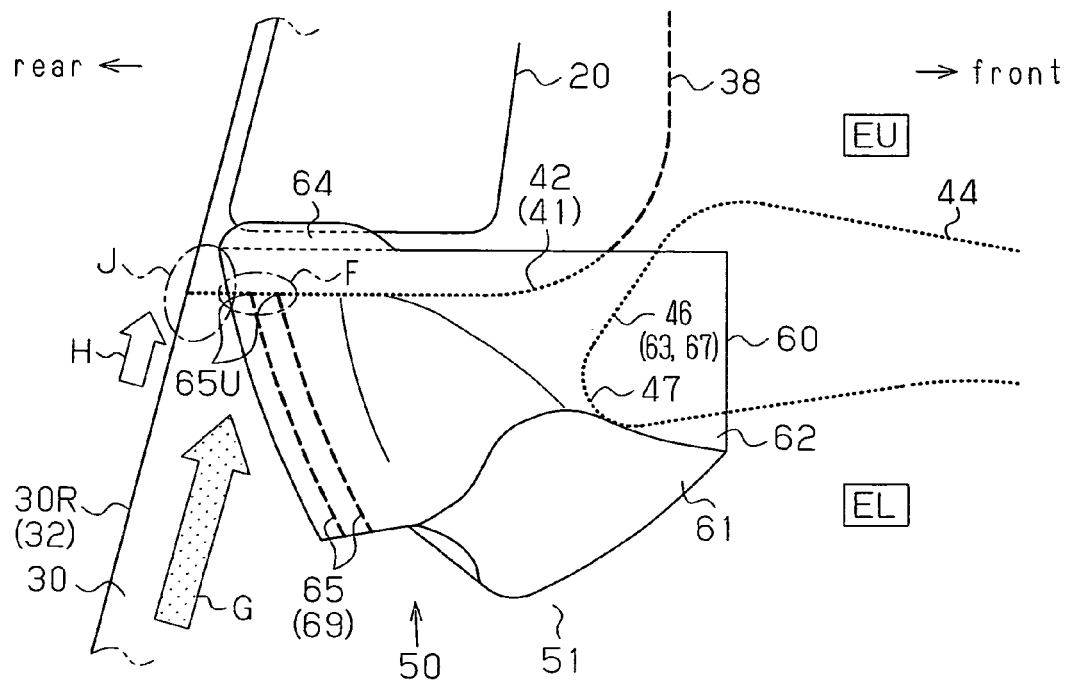
FIG. 14 is a diagram showing the check valve in a state immediately after the supply of the inflation gas is stopped.
Figure 15:
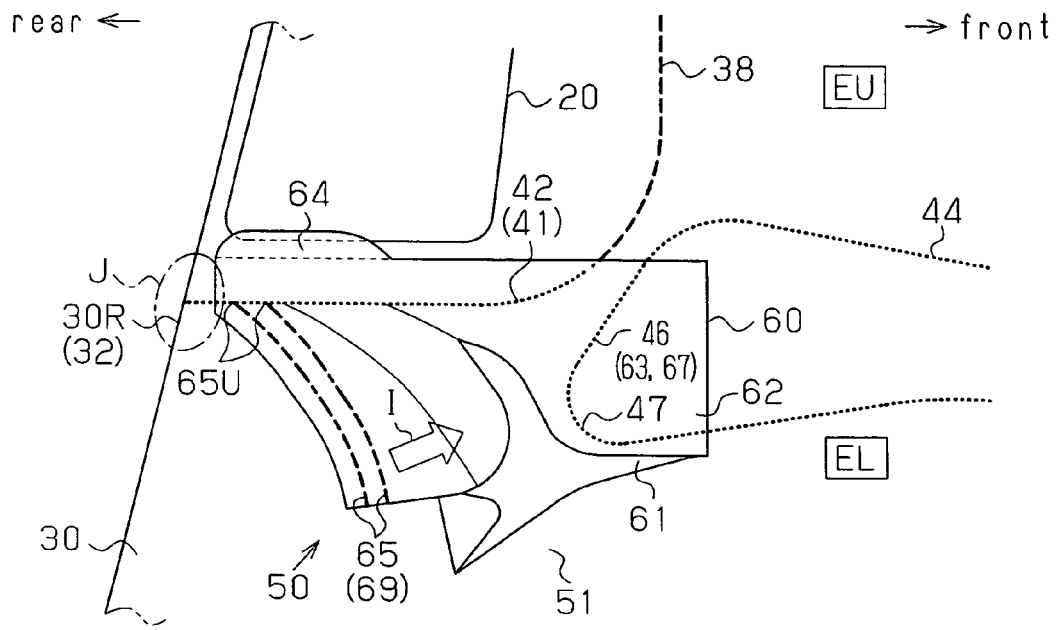
FIG. 15 is a diagram showing a state in which the check valve is closed.

As shown in FIG. 14, when the ejection of the inflation gas G stops, the inflation gas G in the lower inflation portion EL of a high internal pressure acts to flow to the upper inflation portion EU of a low internal pressure through the check valve 60. At this time, the check valve 60 operates in the following manner. At the same time as the ejection of the inflation gas G stops, the flexible portions 64, which are pulled toward the upper inflation portion EU based on the difference in inner diameter between the valve body portions 61, 62, receives the inflation gas G flowing from the lower inflation portion EL to the upper inflation portion EU and is pushed at once. The push further lifts the flexible portions 64 of the valve body portions 61, 62 as indicated by arrow H in FIG. 14. Accordingly, parts of the valve body portions 61, 62 below the flexible portions 64 are further pulled toward the outflow-side joint portions 41, 42 (upward) and toward the wall joint portions 63 (forward).

At this time, the rigid portions 65 are also pulled toward the outflow-side joint portions 41, 42. The rigid portions 65 fall onto the outflow-side joint portions 41, 42 and the wall joint portion 63 about a fulcrum, which is a region in the vicinity of the upper ends 65U located close to the outflow-side joint portions 41, 42 (a part encompassed by frame F). At this time, in parts of the valve body portions 61, 62 below the flexible portions 64, parts that are forward of the rigid portions 65 receive a high pressure applied by the inflation gas G flowing from the lower inflation portion EL toward the upper inflation portion EU. These pressure receiving parts are pressed into the space between the valve body portions 61, 62 and further bent diagonally upward as indicated by arrow I in FIG. 15. Accordingly, the space between the valve body portions 61, 62, that is, the flow passage of the inflation gas G is narrowed.

Figure 16:
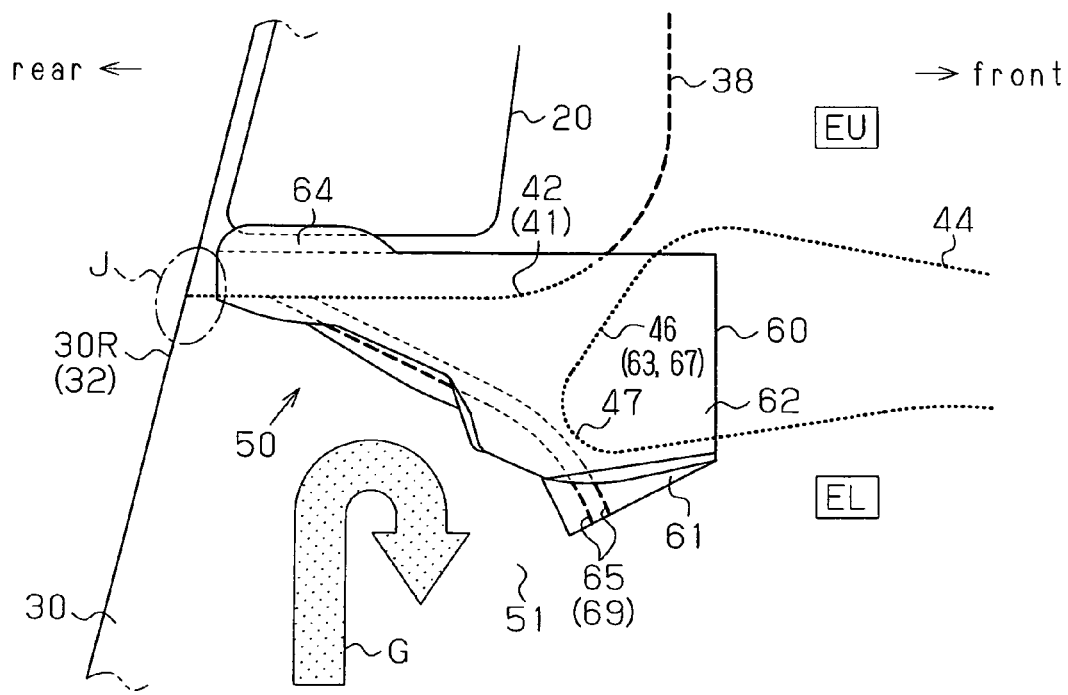
FIG. 16 is a diagram showing a state in which the check valve is completely closed.

In the present embodiment, the length L2 of the rigid portions 65 is longer than the distance D3 (L2>D3). Thus, when the rigid portions 65 are falling diagonally upward, the rigid portions 65 contact the projection 47 of the connecting portion 46 as shown in FIG. 16. The projection 47 prevents the rigid portions 65 from falling onto the outflow-side joint portions 41, 42 and the wall joint portion 63. In this state, since the check valve 60 is substantially closed, the inflation gas G in the lower inflation portion EL is prevented from flowing to the upper inflation portion EU through between the valve body portions 61, 62.

Therefore, the internal pressure of the lower inflation portion EL, which has been raised to an appropriate level for protecting the lumbar region PP, is not lowered by backflow of the inflation gas G to the upper inflation portion EU.

Thereafter, the check valve 60 continues to restrict flow of the inflation gas G from the lower inflation portion EL to the upper inflation portion EU (backflow), while permitting the inflation gas G to flow from the upper inflation portion EU to the lower inflation portion EL. Therefore, even if the airbag 30 restrains the lumbar region PP so that the internal pressure of the lower inflation portion EL is increased, the check valve 60 keeps restricting flow of the inflation gas G from the lower inflation portion EL to the upper inflation portion EU. Therefore, the internal pressure of the upper inflation portion EU is not increased by the influence of pressure changes of the lower inflation portion EL caused by restraint of the lumbar region PP.

Particularly, the inflation gas G flows between the upper inflation portion EU and the lower inflation portion EL only through the check valve 60. That is, the inflation gas G does not flow between the upper inflation EU and the lower inflation portion EL without flowing through the check valve 60. Thus, the check valve 60 is not impaired by the flow of the inflation gas G.

In a case where the internal pressure of the lower inflation portion EL reaches such a level that causes the rigid portions 65 contacting the wall joint portion 63 to move beyond the wall joint portion 63, the parts of the valve body portions 61, 62 below the flexible portions 64 follow the rigid portions 65 and act to move beyond the wall joint portion 63 to be inverted. This phenomena might open the closed flow passage between the valve body portions 61, 62 and cause the inflation gas G in the lower inflation portion EL to flow back to the upper inflation portion EU through the check valve 60. However, in the present embodiment, the lower end of the inflator assembly 20 is located in the vicinity of the outflow-side joint portions 41, 42 in the upper inflation portion EU. Thus, the lower end of the inflator assembly 20 prevents the rigid portions 65 and the valve body portions 61, 62 from moving toward the upper inflation portion EU by an excessive amount from the position of the closed state. As a result, the rigid portions 65 and the valve body portions 61, 62 are prevented from moving beyond the wall joint portion 63 and from being inverted.

In the above, a typical operation of the side airbag apparatus has been described, the side airbag apparatus can operate in different manners. According to another mode, the check valve 60 operates in the same manner as described above partway. That is, the operation is the same up to the point where the flexible portions 64 are pulled toward the gas outflow inflation portions and the rigid portions 65 pulled toward the outflow-side joint portions 41, 42 and toward the wall joint portion 63.

After a such pulling action, parts of the valve body portions 61, 62 below the flexible portions 64 are brought closer to each other by the high pressure of the inflation gas G flowing from the lower inflation portion EL to the upper inflation portion EU. The pressure receiving parts are collapsed toward the upper inflation portion EU, while being sequentially brought closely contact with the rigid portions 65 from sections closest to the rigid portions 65. This reliably closes the flow passage of the inflation gas G between the valve body portions 61, 62.

The present embodiment described above has the following advantages.

(1) The upper ends of the valve body portions 61, 62 are joined to the corresponding communication passage walls 51, 52 by the outflow-side joint portions 41, 42, respectively. The flexible portions 64 are located between the outflow-side joint portions 41, 42 and the lower inflation portion EL and in the vicinity of the outflow-side joint portions 41, 42. The front edges of the valve body portions 61, 62 are joined to the corresponding communication passage walls 51, 52 by the first edge joint portion 67. The first edge joint portion 67 also functions as the wall joint portion 63 that joins the communication passage walls 51, 52 to each other. The rear portions of the valve body portions 61, 62 are joined together by a second edge joint portion 68. The auxiliary joint portion 69 is located between the first edge joint portion 67 and the second edge joint portion 68, and in the vicinity of the second edge joint portion 68. The auxiliary joint portion 69 joins the valve body portions 61, 62 to each other, and extends from the vicinity of the lower ends of the flexible portions 64 toward the lower inflation portion EL. The auxiliary joint portion 69 also functions as the rigid portions 65, which extend along the gas flowing direction and are harder to flex than the flexible portions 64.

With the above structure, when the inflation gas G is supplied to the check valve 60, the pressure of the inflation gas G opens the upper and lower ends of the valve body portions 61, 62 so that the inflation gas G can flow between the upper inflation portion EU and the lower inflation portion EL. When the supply of the inflation gas G is stopped, the difference in internal pressure between the inflation portions EL and EU causes the rigid portions 65 to fall toward the outflow-side joint portions 41, 42 and the wall joint portion 63 about a fulcrum, which is the upper ends 65U. This reduces the flow passage between the valve body portions 61, 62. Accordingly, the check valve 60 is closed, and the inflation gas G is prevented from flowing back from the lower inflation portion EL to the upper inflation portion EU. Thus, the check valve 60 is reliably opened and closed. With the above structure, the check valve 60 is opened and closed by the pressure of the inflation gas G. Therefore, no means for actuating the check valve 60 is required. This simplifies the structure of the check valve 60.

(2) The length L2 of the rigid portions 65 is longer than the distance D3 between the distal end 47T of the projection 47 and the ends C of the outflow-side joint portions 41, 42. Therefore, the rigid portions 65 and parts of the valve body portions 61, 62 that are below the flexible portions 64 are prevented from moving beyond the wall joint portion 63 and from being inverted. The flow passage between the valve body portions 61, 62 is reliably closed.

(3) The lower end of the inflator assembly 20 is located in the vicinity of the outflow-side joint portions 41, 42 in the upper inflation portion EU. This arrangement of the inflator assembly 20 prevents the rigid portions 65 and the valve body portions 61, 62 from moving beyond the wall joint portion 63 and from being inverted, even if the internal pressure of the lower inflation portion EL is excessively increased. The check valve 60 is therefore maintained closed.

(4) The rigid portions 65 are formed by sewing the valve body portions 61, 62 with sewing threads. That is, by simply sewing the valve body portions 61, 62 with sewing threads, the rigid portions 65, which are harder to flex than the flexible portions 64, are reliably formed.

(5) The airbag 30 is used in a side airbag apparatus, which is inflated and deployed forward in a space between the body side portion 11 and the occupant P seated on the vehicle seat 12. The lower inflation portion EL, which is inflated in the vicinity of the lumbar region PP of the occupant P, is used as a gas inflow inflation portion, and the upper inflation portion EU, which is inflated in the vicinity of the thorax PT of the occupant P, is used a gas outflow inflation portion. In this case, even if the inflated airbag 30 restrains the lumbar region PP so that the internal pressure of the lower inflation portion EL is increased, the check valve 60 restricts flow of the inflation gas G from the lower inflation portion EL to the upper inflation portion EU. That is, the internal pressure of the upper inflation portion EU is prevented from being increased by pressure changes of the lower inflation portion EL caused by restraint of the lumbar region PP. Thus, the thorax PT, which has a low impact resistance, is softly protected by the upper inflation portion EU, while the lumbar region PP, which has a high impact resistance, is reliably restrained by the lower inflation portion EL.

Second Embodiment

A side airbag apparatus according to a first embodiment of the present invention will now be described with reference to FIGS. 17 to 21. Like or the same reference numerals are given to those components that are like or the same as the corresponding components of the first embodiment.

Figure 17:
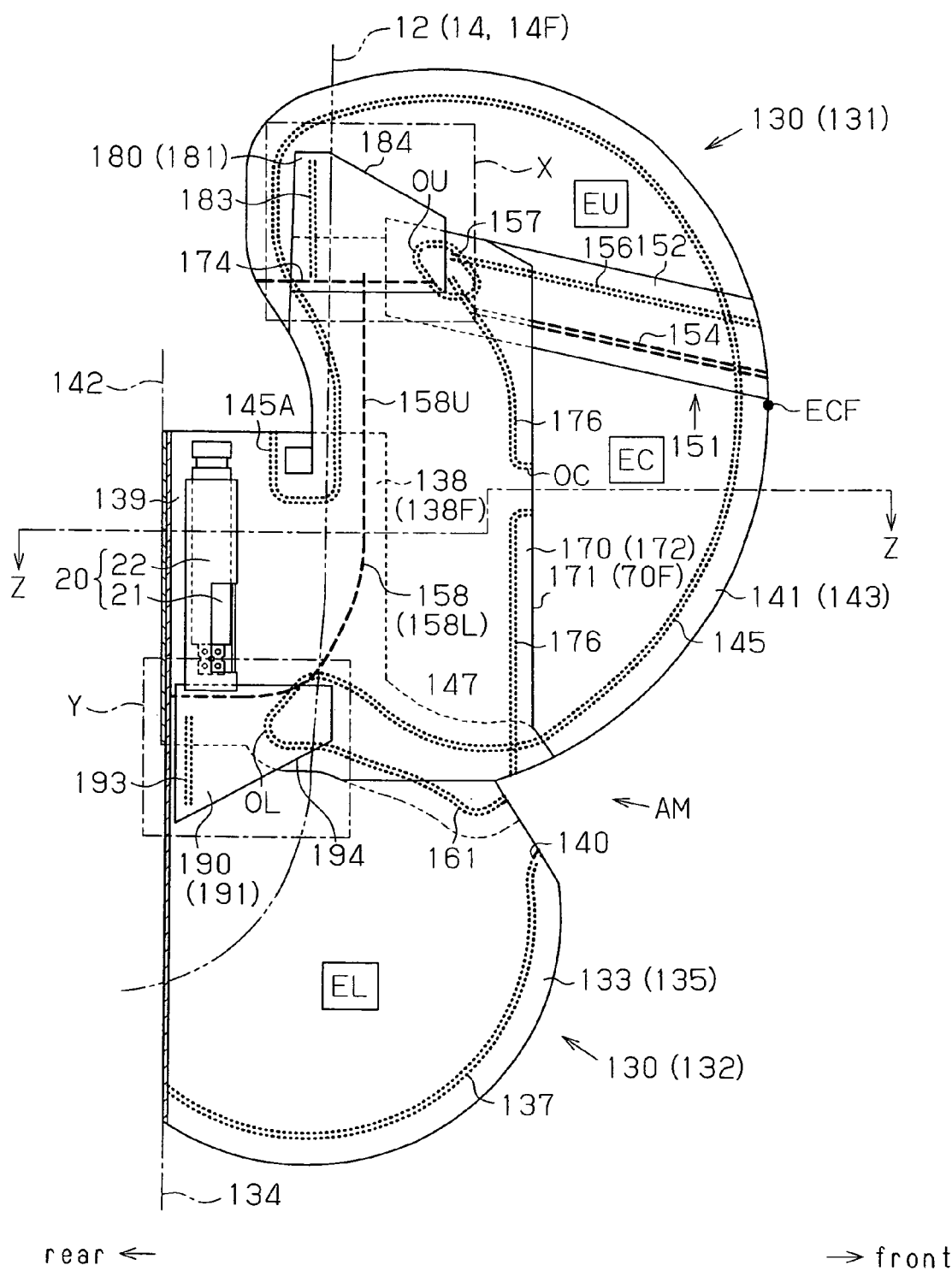
FIG. 17 is a cross-sectional view illustrating an airbag module of a side airbag apparatus according to a second embodiment of the present invention.

FIG. 17 shows the inner structure of an airbag module AM in a state where a seat back 14 is upright along a vertical direction. FIG. 17 shows half of the airbag module AM that is located on the vehicle inner side. The airbag 130 includes a first inflation body 131 and a second inflation body 132. Most of the first inflation body 131 is located above the second inflation body 132.

(i) Configuration of Second Inflation Body 132

Figure 18:
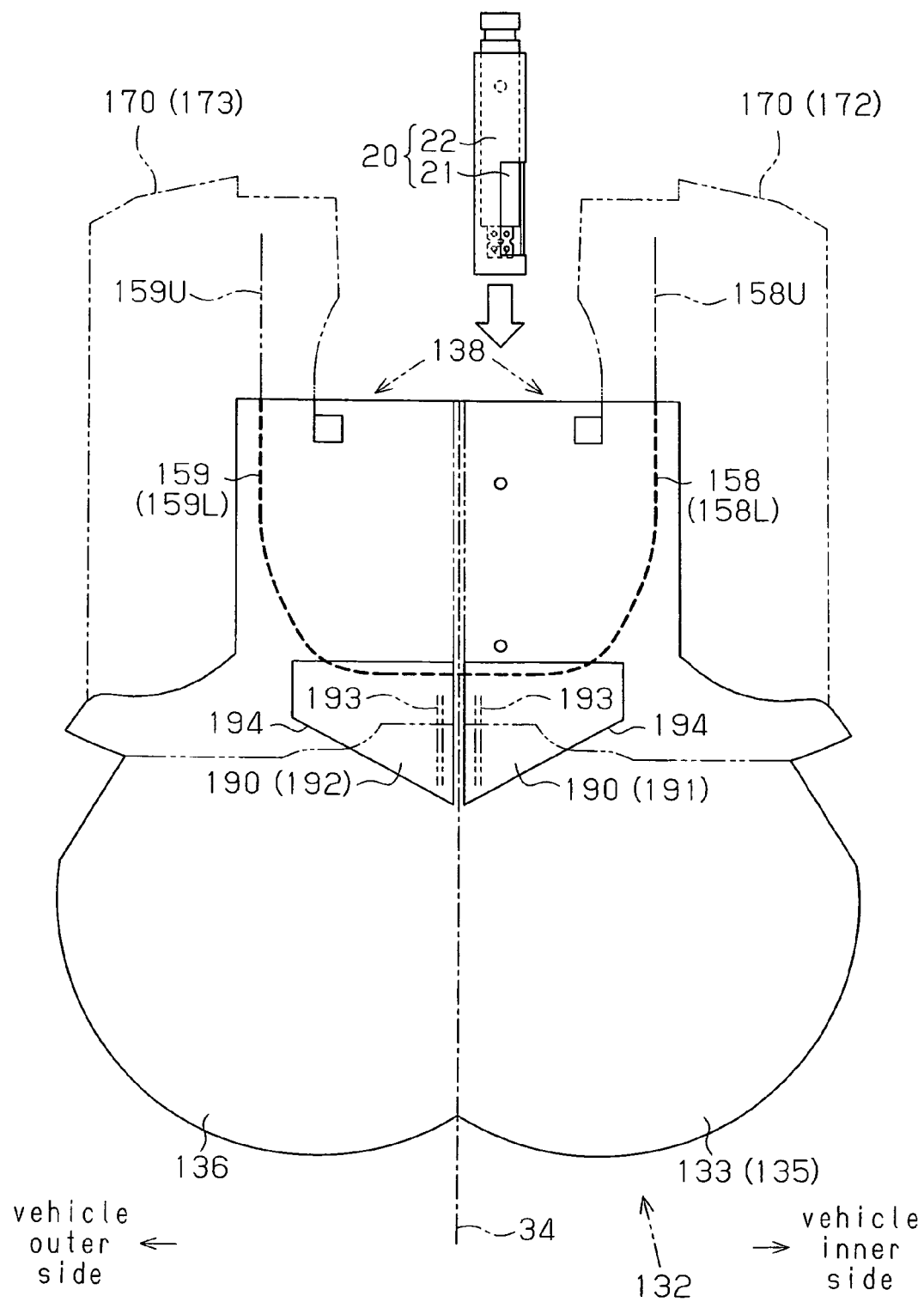
FIG. 18 is a plan view illustrating a state in which a second inflation body and other portions are spread flat.

As shown in FIGS. 17 and 18, the second inflation body 132 is formed by a fabric panel 133, which is a single fabric sheet. A folding line 134 is formed in a center of the fabric panel 133. The fabric panel 133 is folded into half at the folding line 134 so as to overlap onto itself. A part of the fabric panel 133 that is located on the vehicle inner side is referred to as a fabric portion 135, and a part located on the vehicle outer side is referred to as a fabric portion 136. The fabric portions 135, 136 are symmetrically arranged with respect to the folding line 134.

The peripheral portions of the fabric portions 135, 136 except for upper portions are joined to each other by a peripheral joint portion 137. The peripheral joint portion 137 is formed by sewing the fabric portions 135, 136 with sewing threads. Portions of the fabric portions 135, 136 that are not joined form a discharge port 140 for discharging the inflation gas G that has inflated the second inflation body 132 to the outside. The discharge port 140 is located between the peripheral joint portion 137 and a dividing joint portion 161. The fabric portions 135, 136 may be joined together such that the discharge port 140 is closed.

A part of the airbag 130 that is encompassed by the peripheral joint portion 137 is a lower inflation portion EL that is inflated and deployed by a relatively high internal pressure to restrain and protect the lumbar region PP of the occupant P. The lower inflation portion EL is located below a central inflation portion EC. A part of the airbag 130 without the peripheral joint portion 137 is an insertion portion 138. An inflator accommodating portion 139 for accommodating the inflator assembly 20 is provided at a position forward of a folding line 134 of the insertion portion 138. The fabric portions 135, 136 are not sewn to each other at a front edge 138F of the insertion portion 138. The inflator accommodating portion 139 thus communicates with the insertion portion 138.

(ii) Configuration of First Inflation Body 31

Figure 19:
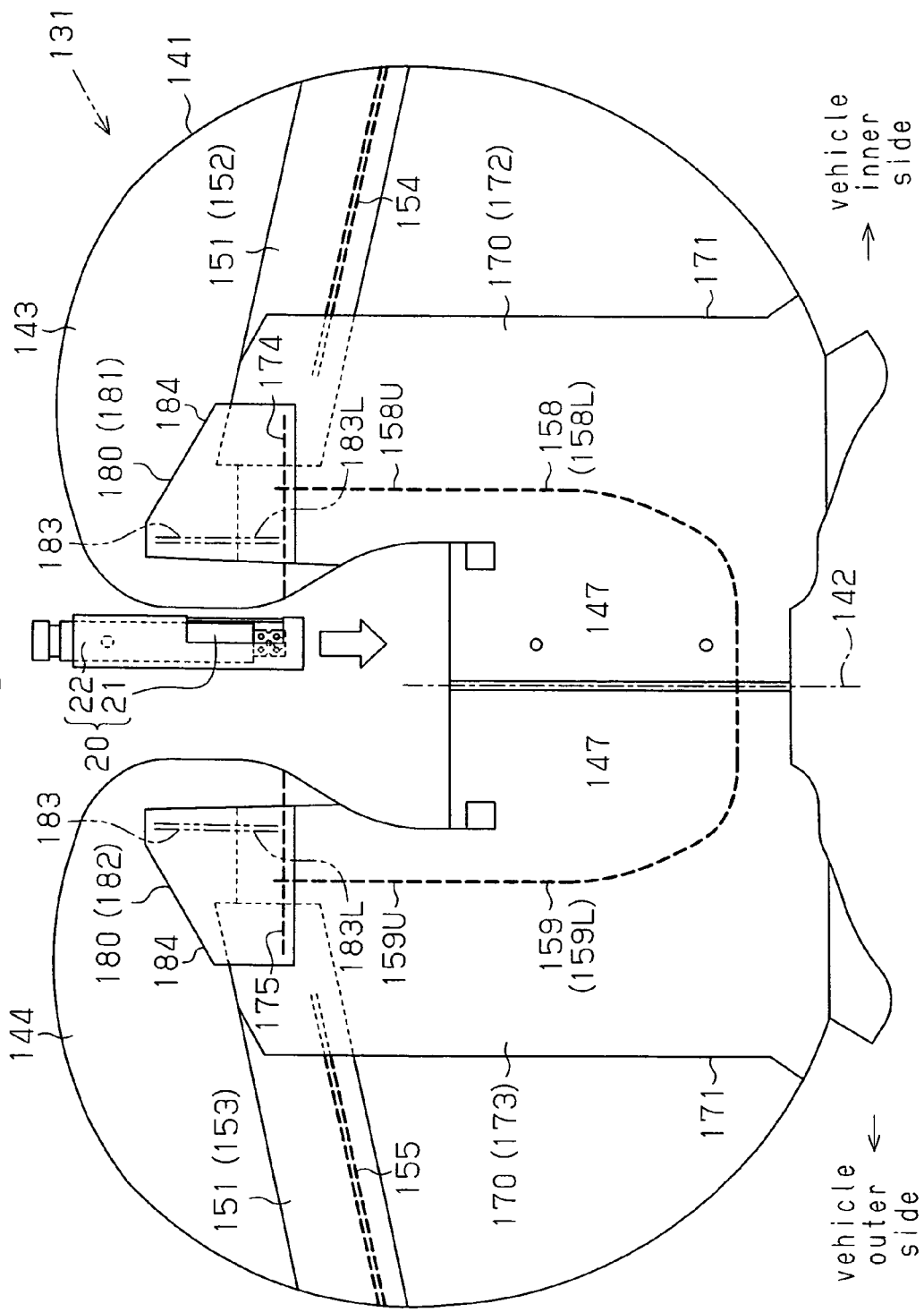
FIG. 19 is a plan view illustrating a state in which a first inflation body and other portions are spread flat.

As shown in FIGS. 17 and 19, the first inflation body 131 is formed by a fabric panel 141, which is a single fabric sheet. A folding line 141 is formed in a center of the fabric panel 142. The fabric panel 141 is folded into half at the folding line 142 so as to overlap onto itself. A part of the fabric panel 141 that is located on the vehicle inner side is referred to as a fabric portion 143, and a part located on the vehicle outer side is referred to as a fabric portion 144. The fabric portions 143, 144 are symmetrically arranged with respect to the folding line 142. The peripheral portions of the fabric portions 143, 144 except for lower portions are connected to each other by a peripheral joining portion 145. At a lower portion of the first inflation body 131, a receptacle portion 147 is provided in front of the folding line 142.

A tether 151 is provided in the first inflation body 131. The tether 151 includes a pair of tether pieces 152, 153. The tether pieces 152, 153 are each formed by a thin rectangular fabric sheet that extends in the front-rear direction. The front end of each of the tether pieces 152, 153 reaches the front ends of the fabric portions 143, 144, and the rear ends of the tether pieces 152, 153 extend to positions forward of the rear end of the fabric portions 143, 144. The lower edge of the tether piece 152 is joined to the fabric portion 143 on the vehicle inner side by a lower joint portion 154. The lower edge of the tether piece 153 is joined to the fabric portion 144 on the vehicle outer side by a lower joint portion 155. The front ends of the joint portions 154, 155 reach the front end of the peripheral joint portion 145, and the rear ends of the joint portions 154, 155 reach a center region of the first inflation body 131. The upper edges of the tether pieces 152, 153 are joined together by an upper joint portion 156. The lower joint portions 154, 155 and the upper joint portion 156 are formed by sewing with sewing threads. The tether 151 extends between the fabric portions 143, 144 of the first inflation body 131. When the airbag 130 is not inflated, most parts of the tether pieces 152, 153 overlap with each other.

The inner space of the first inflation body 131 is divided into an upper inflation portion EU and the central inflation portion EC by the tether 151. The upper inflation portion EU is inflated and deployed by a relatively high internal pressure, and restrains and protects a shoulder PS of the occupant P. The central inflation portion EC is inflated and deployed by an internal pressure lower than that of the upper inflation portion EU, and restrains and protects the thorax PT of the occupant P. The central inflation portion EC is located below the upper inflation portion EU. The tether 151 restricts the thickness of the first inflation body 131 when inflated. Instead of the tether 151, the inner space of the first inflation body 131 may be divided into the upper inflation portion EU and the central inflation portion EC by a seam. The seam is formed by sewing the fabric portions 143, 144 after overlapping these on top of each other.

An annular closing portion 157 is provided in a portion of the first inflation body 131 that corresponds to an arm PA, more specifically, in a portion in the vicinity of the rear end of the tether 151. The closing portion 157 allows an upper valve 180 provided in an upper opening OU to function as a check valve. The closing portion 157 is formed by annularly sewing the fabric portions 143, 144 with sewing threads.

(iii) Combined Configuration of First and Second Inflation Bodies 131, 132

As shown in FIGS. 17 to 19, the insertion portion 138 of the second inflation body 132 is inserted into the receptacle portion 147 with the folding line 134 matched with the folding line 142 of the first inflation body 131. The arrangement allows the receptacle portion 147 to wrap around of the insertion portion 138.

A portion of the insertion portion 138 on the vehicle inner side is joined to a portion of the receptacle portion 147 on the vehicle inner side by the inner joint portion 158. A portion of the insertion portion 138 on the vehicle outer side is joined to a portion of the receptacle portion 147 on the vehicle outer side by the inner joint portion 159. The inner joint portions 158, 159 do not connect the portions on the vehicle inner side and the portions on the vehicle outer side of the insertion portion 138 and the receptacle portion 147 to each other.

The insertion portion 138 and the receptacle portion 147 are joined to each other by the dividing joint portion 161. If the insertion portion 138 is simply inserted into the receptacle portion 147, the inner space of the first inflation body 131 and the inner space of the second inflation body 132 remain communicating with each other. In the present embodiment, the dividing joint portions 161 defines the inner space of the first inflation body 131 and the inner space of the second inflation body 132. Further, the insertion portion 138 and the receptacle portion 147 are joined to each other by a part 145A of the peripheral joint portion 145.

The second inflation body 132 is a lower inflation portion EL that is inflated and deployed by a relatively high internal pressure to restrain and protect the lumbar region PP of the occupant P. The inflator assembly 20 is provided in the inflator accommodating portion 139 of the airbag 130, while being inclined to be lower toward the front end. Most of the inflator assembly 20 is located in the central inflation portion EC. Two bolts 26 fixed to the retainer 22 are passed through rear portions of the fabric portions 135, 143 on the vehicle inner side. A part in the vicinity of the peripheral joint portion 145A of the airbag 130 is airtightly fastened to the upper end of the inflator assembly 20 by an annular fastening tool attached to the outside of the airbag 130. In the second embodiment, an inner bag 170, the upper valve 180 serving as a check valve, and a lower valve 190 are located in the airbag 130.

<Inner Bag 170>

The inner bag 170 mainly guides the inflation gas G from the inflator 21 to an upper portion, a front portion, and a lower portion in the airbag 130, and inflates a rear portion of the central inflation portion EC of the airbag 130 by its own inflation. The inner bag 170 is arranged in the central inflation portion EC while satisfying the following condition (I). The condition (I) refers to a state in which, which the airbag 130 inflated and deployed and upright to be vertical, a front end 170F of the inner bag 170 is located rearward of a front end ECF of the central inflation portion EC and forward of a front end 14F of the seat back 14. A front edge 171 of the inner bag 170 extends along the up-down direction at a center of the first inflation body 131. The upper end of the front edge 171 is located forward of the closing portion 157, and the lower end of the front edge 171 is located at the lower end of the central inflation portion EC (the first inflation body 131). The rear end of the inner bag 170 is substantially located at the same spot as the rear end of the first inflation body 131.

Unlike the first and second inflation bodies 131, 132, the inner bag 170 separately includes a fabric portion 172 located on the vehicle inner side and a fabric portion 173 located on the vehicle outer side. The fabric portion 172 is joined to the fabric portion 143 of the first inflation body 131 by an upper portion 158U of the inner joint portion 158, and is joined to the fabric portion 143 and the fabric portion 135 of the second inflation body 132 by a remaining portion 158L of the inner joint portion 158. The upper end of the fabric portion 172 is joined to the fabric portion 143 of the first inflation body 131 by another inner joint portion 174. The front end of the inner joint portion 174 reaches the closing portion 157, and the rear end of the inner joint portion 174 reaches the rear end of the fabric portion 143.

Likewise, the fabric portion 173 is joined to the fabric portion 144 of the first inflation body 131 by an upper portion 159U of the inner joint portion 159, and is joined to the fabric portion 144 of the first inflation body 131 and the fabric portion 136 of the second inflation body 132 by a remaining portion 159L of the inner joint portion 159. The upper end of the fabric portion 173 is joined to the fabric portion 144 of the first inflation body 131 by another inner joint portion 175. The front end of the inner joint portion 175 reaches the closing portion 157, and the rear end of the inner joint portion 175 reaches the rear end of the fabric portion 144.

The front edges of the fabric portions 172, 173 are joined together by a joint portion 176. A center opening OC is formed in a center of the fabric portions 172, 173, at which the joint portion 176 is not provided. The inner space of the inner bag 170 communicates with the central inflation portion EC through the center opening OC. The center opening OC faces forward.

The fabric portions 172, 173 are joined to the tether 151 and the fabric portions 143, 144 by the closing portion 157. Also, the fabric portions 172, 173 are joined to the fabric portions 143, 144 of the first inflation body 131 and to the fabric portions 135, 136 of the second inflation body 132 by the dividing joint portion 161.

The upper end of the inner bag 170 is joined to the fabric portions 143, 144 by the inner joint portions 174, 175 in a space between the closing portion 157 and the rear end of the peripheral joint portion 145. A part of the inner bag 70 to which the fabric portions 172, 173 are not joined is referred to as the upper opening OU. The inner space of the inner bag 170 communicates with the upper inflation portion EU through the upper opening OU. The upper opening OU faces upward.

The lower end of the inner bag 170 is joined to the fabric portions 135, 136 by the inner joint portions 158, 159 in a space between the rear end of the dividing joint portion 161 and the folding line 134. A part of the inner bag 170 to which the fabric portions 172, 173 are not joined is referred to as a lower opening OL. The inner joint portions 158, 159 intersect the peripheral joint portion 145. The inner space of the inner bag 170 communicates with the lower inflation portion EL through the lower opening OL. The lower opening OL faces downward. If the flow passage areas of the center opening OC, the upper opening OU, and the lower opening OL are represented by SC, SU, and SL, respectively, the expressions SC<SU and SC<SL are satisfied. The flow passage areas SU and SL have similar sizes.

<Upper Valve 180>

The upper valve 180 only permits the inflation gas G to flow from the inner bag 170 to the upper inflation portion EU. The upper valve 180 is located in the vicinity of the upper opening OU of the upper inflation portion EU. The upper valve 180 is located in the vicinity of the rear end of the airbag 130.

The upper valve 180 separately includes a fabric portion 181 located on the vehicle inner side and a fabric portion 182 located on the vehicle outer side. The lower ends of the fabric portions 181, 182 are arranged at the upper end of the inner bag 170 in the upper opening OU.

The fabric portions 181, 182 are joined to the inner bag 170 and the airbag 130 by using parts of the inner joint portions 174, 175 and a part of the closing portion 157. The lower end of the fabric portion 181, together with the fabric portion 172 of the inner bag 170, is joined to the fabric portion 143 of the first inflation body 131 by the inner joint portion 174. Also, the lower end of the fabric portion 182, together with the fabric portion 173 of the inner bag 170, is joined to the fabric portion 144 of the first inflation body 131 by the inner joint portion 175. The inner joint portion 174 is formed by sewing the fabric portions 181, 172 of the upper valve 180 and the inner bag 170 to the fabric portion 143 of the first inflation body 131. The inner joint portion 175 is formed by sewing the fabric portions 182, 173 of the upper valve 180 and the inner bag 170 to the fabric portion 144 of the first inflation body 131. The lower end of the fabric portion 181 and the lower end of the fabric portion 182 are not joined to each other.

The front ends of the fabric portions 181, 182, together with the fabric portions 172, 173 of the inner bag 170 and the tether pieces 152, 153 of the tether 151, are joined to the fabric portions 143, 144 of the first inflation body 131 by the closing portion 157. The closing portion 157 is formed by sewing the first inflation body 131, the tether 151, the inner bag 170, and the upper valve 180 together.

Figure 20:
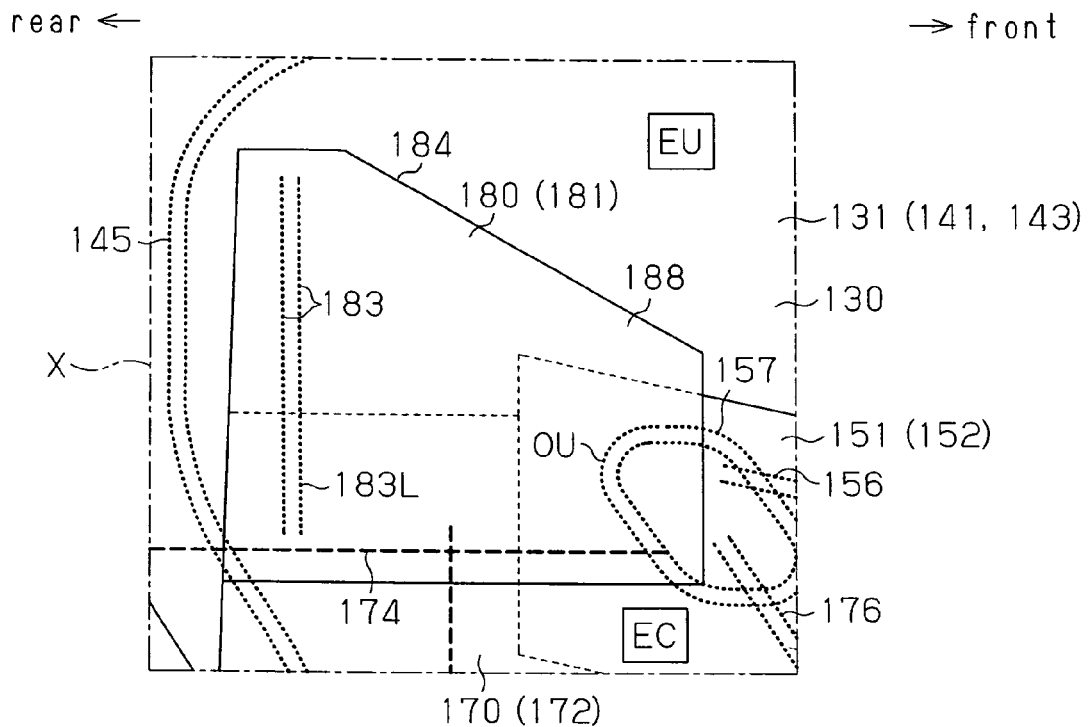
FIG. 20 is an enlarged cross-sectional view illustrating region X of FIG. 17.

As shown in FIGS. 17 and 20, a joint portion 183 extending in the up-down direction is provided at the fabric portions 181, 182. The fabric portions 181, 182 are joined to each other by the joint portion 183. A lower end 183L of the joint portion 183 reaches the upper ends of the fabric portions 172, 173 of the inner bag 170. The lower ends of the rear portions of the fabric portions 181, 182 are joined to the inner bag 170. The joint portion 183 is formed by sewing the rear ends of the fabric portions 181, 182 together at a portion of the upper valve 180 that is outside of the inner bag 170. The joint portion 183 is formed by sewing the upper valve 180 and the inner bag 170 together at a portion of the upper valve 180 that is inside of the inner bag 170.

The fabric portions 181, 182 each have an inclined portion 184, which is inclined to be lower toward the front end. The fabric portions 181, 182 are not joined together at parts corresponding to the inclined portions 184. The lower ends of the fabric portions 181, 182 are joined to the fabric portions 172, 173, 143, and 144. However, the fabric portions 181, 182 are not joined to each other. Therefore, the upper valve 180 has a cylindrical shape opened at the inclined portions 184 and the lower end.

Since the fabric portion 181 is joined to the fabric portion 143 of the first inflation body 131 by the inner joint portion 174, the inflation gas G cannot flow between the upper inflation portion EU and the central inflation portion EC through between the fabric portions 181, 143. Likewise, since the fabric portion 182 is joined to the fabric portion 144 of the first inflation body 131 by the inner joint portion 175, the inflation gas G cannot flow between the upper inflation portion EU and the central inflation portion EC through between the fabric portions 182, 144. The inflation gas G can flow between the upper inflation portion EU and the central inflation portion EC by flowing through only the upper valve 180. The lower ends of the fabric portions 181, 182 are located rearward of the tether 151 and faces the central inflation portion EC. The inclined portions 184 of the fabric portions 181, 182 are located at a lower part in the upper inflation portion EU, and rearward of the tether 151.

The lower ends and the front ends of the fabric portions 181, 182 are joined to the fabric portions 143, 144 of the first inflation body 131. The fabric portions 181, 182 are not joined to the fabric portions 143, 144 at the remaining portions. Thus, the upper portion of the upper valve 180 is easier to flex than other parts. Thus, when the internal pressure of the central inflation portion EC is higher than the internal pressure of the upper inflation portion EU, the upper portion of the upper valve 180 extends upward so that the upper opening OU is opened. In contrast, when the internal pressure of the central inflation portion EC is lower than the internal pressure of the upper inflation portion EU, the upper opening OU (a bendable portion 188) is closed.

<Lower Valve 190>

The lower valve 190 only permits the inflation gas G to flow from the inner bag 170 to the lower inflation portion EL. The lower valve 190 is located in the vicinity of the lower opening OL of the lower inflation portion EL. The lower valve 190 is located in the vicinity of the rear end of the airbag 130. The lower valve 190 basically has the same structure as the upper valve 180. The lower valve 190 separately includes a fabric portion 191 located on the vehicle inner side and a fabric portion 192 located on the vehicle outer side. The upper ends of the fabric portions 191, 192 are arranged in the inner bag 170 at the lower opening OL.

The fabric portions 191, 192 are joined to the inner bag 170 and the airbag 130 by using parts of the inner joint portions 158, 159 and a part of the dividing joint portion 161. The upper end of the fabric portion 191, together with the fabric portion 172 of the inner bag 170, is joined to the fabric portions 143, 135 of the first inflation body 131 and the second inflation body 132 by the inner joint portion 158. Also, the upper end of the fabric portion 192, together with the fabric portion 173 of the inner bag 170, is joined to the fabric portions 144, 136 of the first inflation body 131 and the second inflation body 132 by the inner joint portion 159. In this case, the inner joint portion 158 is formed by sewing the fabric portions 191, 172 of the lower valve 190 and the inner bag 170 to the fabric portions 143, 135 of the first and second inflation bodies 131, 132. The inner joint portion 159 is formed by sewing the fabric portions 192, 173 of the lower valve 190 and the inner bag 170 to the fabric portions 144, 136 of the first and second inflation bodies 131, 132. The upper end of the fabric portion 191 and the upper end of the fabric portion 192 are not joined to each other.

The front ends of the fabric portions 191, 192, together with the inner bag 170, are joined to the first and second inflation bodies 131, 132 by the dividing joint portion 161. The dividing joint portion 161 is formed by sewing the first inflation body 131, the second inflation body 132, the inner bag 170, and the lower valve 190 together.

Figure 21:
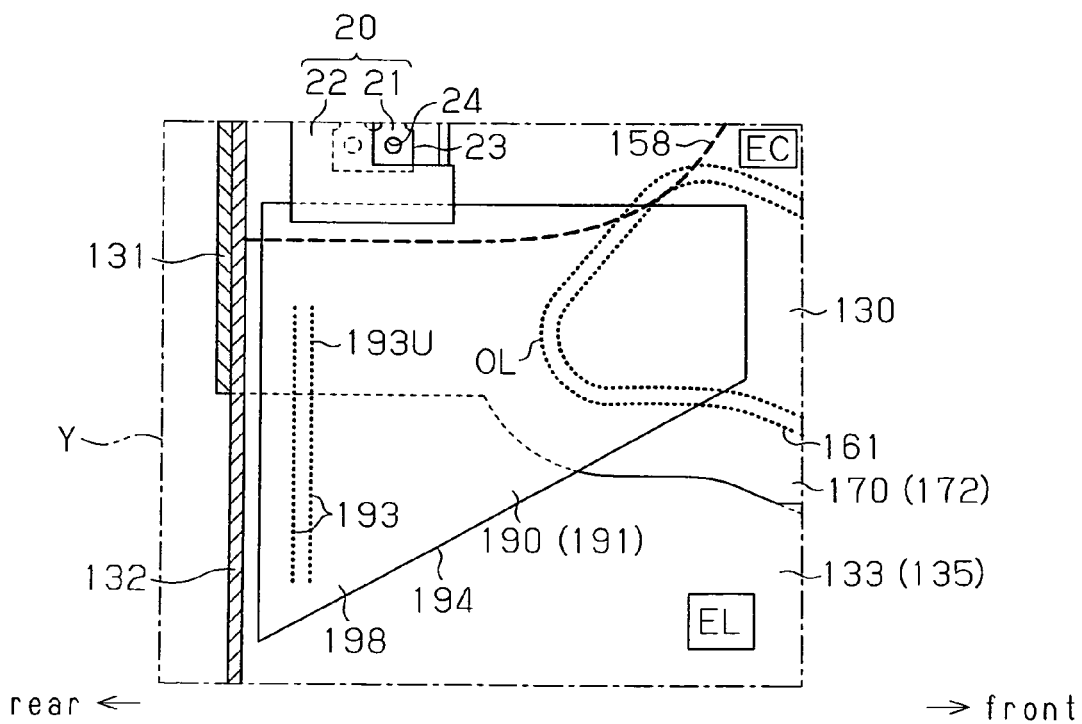
FIG. 21 is an enlarged cross-sectional view illustrating region Y of FIG. 17.

As shown in FIGS. 17 and 21, a joint portion 193 extending in the up-down direction is provided at the fabric portions 191, 192. The fabric portions 191, 192 are joined to each other by the joint portion 193. An upper end 193U of the joint portion 193 reaches the lower end of the inner bag 170. The upper ends of the rear portions of the fabric portions 191, 192 are joined also to the inner bag 170. The joint portion 193 is formed by sewing the rear ends of the fabric portions 191, 192 together at a portion of the lower valve 190 that is outside of the inner bag 170. The joint portion 193 is formed by sewing the lower valve 190 and the inner bag 170 together at a portion of the lower valve 190 that is inside of the inner bag 170.

The fabric portions 191, 192 each have an inclined portion 194, which is inclined to be higher toward the front end. The fabric portions 191, 192 are not joined to each other. The upper ends of the fabric portions 191, 192 are joined to the fabric portions 172, 173, 143, 144, 135, and 136. However, the fabric portions 191, 192 are not joined to each other. Therefore, the lower valve 190 has a cylindrical shape opened at the inclined portions 194 and the upper end.

Since the fabric portion 191 is joined to the fabric portion 135 of the second inflation body 132 by the inner joint portion 158, the inflation gas G cannot flow between the lower inflation portion EL and the central inflation portion EC through between the fabric portions 191, 135. Likewise, since the fabric portion 192 is joined to the fabric portion 136 of the second inflation body 132 by the inner joint portion 159, the inflation gas G cannot flow between the lower inflation portion EL and the central inflation portion EC through between the fabric portions 192, 136. The inflation gas G can flow between the lower inflation portion EL and the central inflation portion EC by flowing through only the lower valve 190.

The upper ends of the fabric portions 191, 192 are located rearward of the dividing joint portion 161 and faces the central inflation portion EC. The inclined portions 194 of the fabric portions 191, 192 are located at an upper part in the lower inflation portion EL, and rearward of the dividing joint portion 161. The lower end of the retainer 22 is tucked into the lower valve 190.

The upper ends and the front ends of the fabric portions 191, 192 are joined to the fabric portions 135, 136. The fabric portions 191, 192 are not joined to the fabric portions 135, 136 at the remaining portions. Thus, the lower portion of the lower valve 190 is easier to flex than other parts. Thus, when the internal pressure of the central inflation portion EC is higher than the internal pressure of the lower inflation portion EL, the lower portion of the lower valve 190 extends downward so that the lower opening OL is opened. In contrast, when the internal pressure of the central inflation portion EC is lower than the internal pressure of the lower inflation portion EL, the lower opening OL (a bendable portion 198) is closed.

The present invention may be embodied in the following forms.

In the first embodiment, the retainer 22, which has a closed upper end and open lower end, may be replaced by a retainer of which the upper and lower ends are both open. Further, without using the retainer 22, the inflator 21 may be directly attached to the seat back 14. Alternatively, the retainer 22 may be replaced by an inner tube made by making a fabric sheet into a cylinder. This modification is made on the premise that the heat and pressure of the inflation gas G from the inflator 21 do not significantly damage the inner tube. Also, this modification is also possible in the case where an inflator that ejects inflation gas G having a relatively low temperature is used. Such inflators include a hybrid type inflator filled with inflation gas. This type of inflator is capable of ejecting inflation gas G at a lower temperature than a pyro type inflator using a gas generating agent to generate inflation gas through chemical reaction accompanied by heat. This modification can be made even in a case where a pyro type inflator is used, if the inner tube is formed by a sheet coated with a coating layer for improving the heat resistance.

In the first embodiment, the present invention may be applied to an airbag apparatus having three or more inflation portions. In this case, the check valve 60 is located in each communication passage between two adjacent inflation portions. In a case where an airbag has three or more inflation portions, the airbag includes a plurality of combinations of adjacent inflation portions. Accordingly, the airbag has a plurality of communication passages. In this case, the check valve 60 is provided in at least one of the communication passages. In a case where the airbag 30 has a plurality of inflation portions, which of the inflation portions is used as a gas inflow inflation portion and which of the inflation portions is used as a gas outflow inflation portion are determined in accordance with the impact resistance of each body part of the occupant P.

In the first embodiment, the rigidity and the length L2 of the rigid portions 65 may be changed to adjust the internal pressure of the inner inflation portion EL when the rigid portions 65 move beyond the wall joint portion 63 or when the valve body portions 61, 62 are inverted. For example, when sewing the rigid portions 65, the rigidity of the rigid portions 65 may be adjusted by changing the type, size, and number of sewing threads. For example, if the size and number are increased, the rigid portions 65 are more rigid, so that the internal pressure of the lower inflation portion EL when the valve body portions 61, 62 are inverted is increased. In the case where the rigid portions 65 are formed by adhesion, the rigidity of the rigid portions 65 can be adjusted by changing the type and applied amount of adhesive. For example, if the applied amount is increased, the rigid portions 65 are more rigid, so that the internal pressure of the lower inflation portion EL when the valve body portions 61, 62 are inverted is increased.

Figure 22:
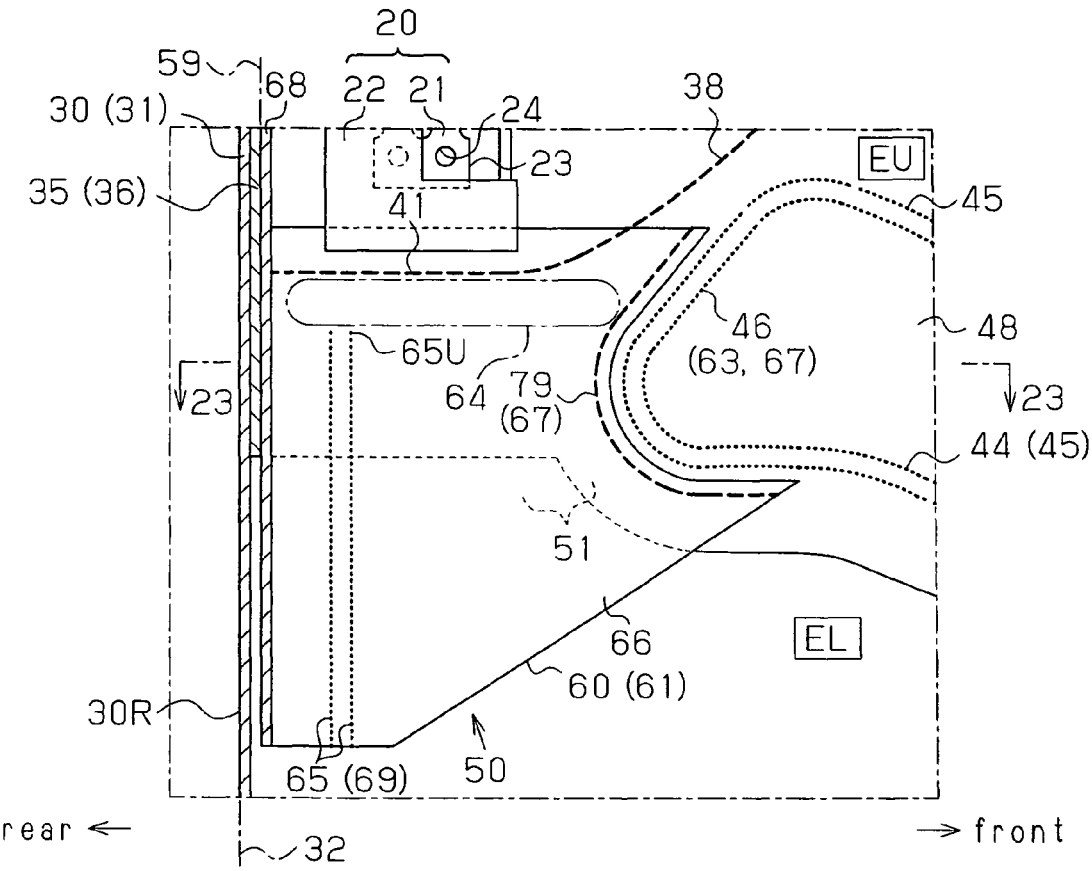
FIG. 22 is partial a cross-sectional view illustrating a check valve of a modification.
Figure 23:
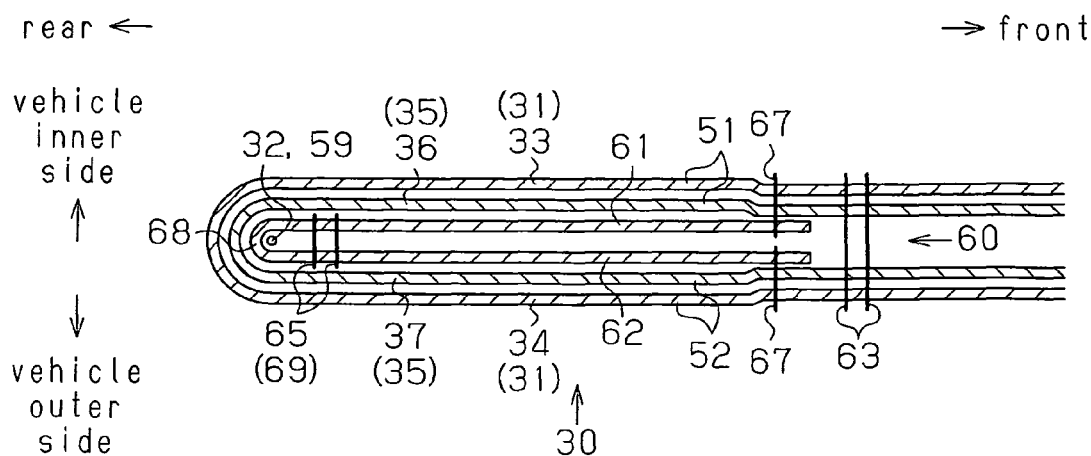
FIG. 23 is a cross-sectional view taken along line 23-23 of FIG. 22.

As shown in FIGS. 22 and 23, the first edge joint portion 67 and the wall joint portion 63 may be located at different positions in the airbag 30. The first edge joint portion 67 may be modified as long as it joins the front edges of the valve body portions 61, 62 to the corresponding communication passage walls 51, 52. In the example shown in FIG. 23, the first edge joint portion 67 joins the first valve body portion 61 only to the first communication passage wall 51 and joins the second valve body portion 62 only to the second communication passage wall 52. The wall joint portion 63 may be modified as long as it joins the communication passage walls 51, 52 to each other. In the example shown in FIG. 23, the wall joint portion 63 only joins the communication passage walls 51, 52 to each other. Even if the first edge joint portion 67 and the wall joint portions 63 are located at different positions as described above, the same advantages as the first embodiment are achieved.

Figure 24:
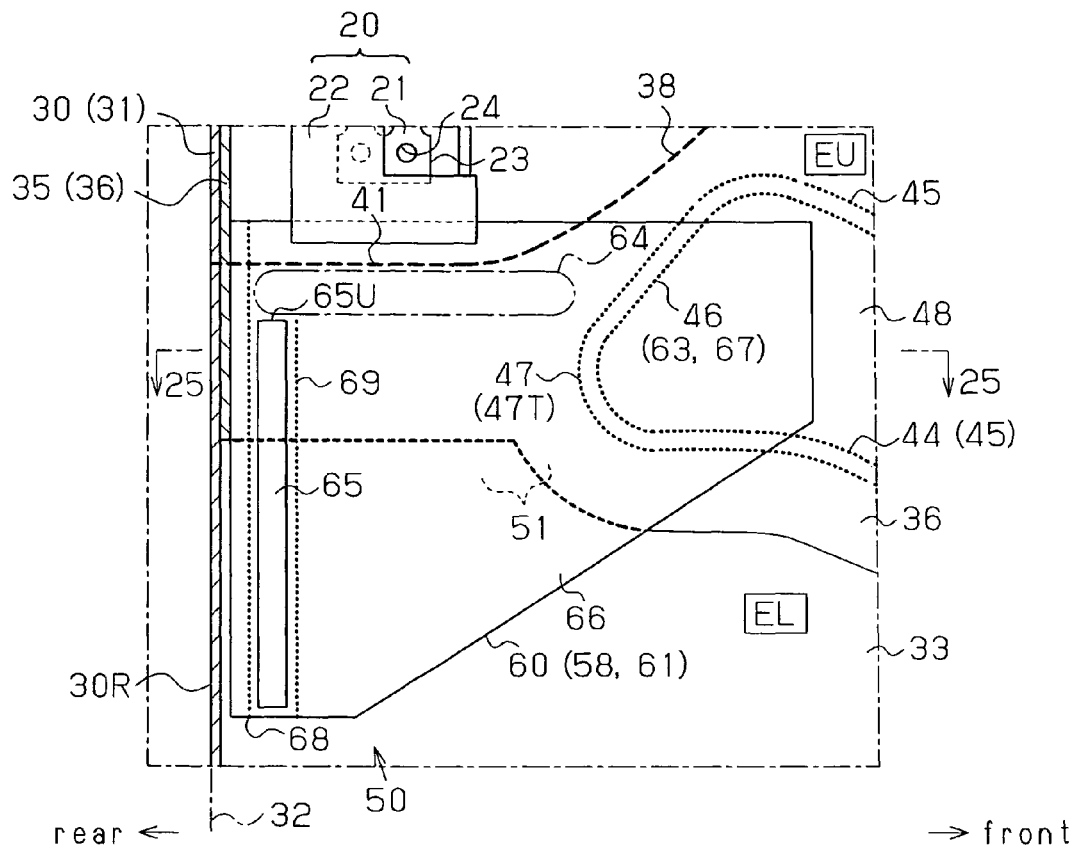
FIG. 24 is partial a cross-sectional view illustrating a check valve of a modification.
Figure 25:
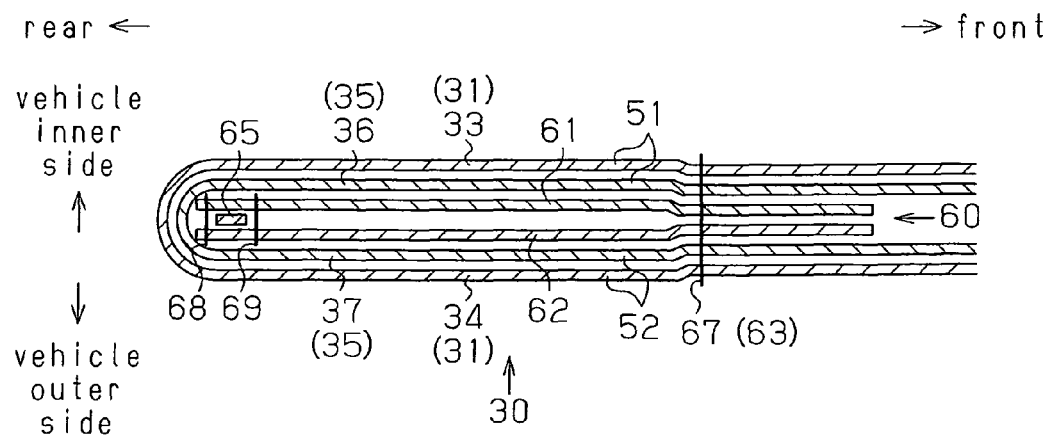
FIG. 25 is a cross-sectional view taken along line 25-25 of FIG. 24.

As shown in FIGS. 24 and 25, the rigid portions 65 and the auxiliary joint portion 69 may be located at different positions in the valve body portions 61, 62. The auxiliary joint portion 69 may be modified as long as it is located in the vicinity of the second edge joint portion 68, and joins the valve body portions 61, 62 to each other, and extends from the vicinity of the lower ends of the flexible portions 64 toward the lower inflation portion EL. The rigid portions 65 may be modified as long as they are provided on or in the vicinity of the auxiliary joint portion 69, extend along the gas flowing direction, and are harder to flex than the flexible portions 64. Even if the rigid portions 65 and the auxiliary joint portion 69 are located at different positions as described above, the same advantages as the first embodiment are achieved.

As shown in FIGS. 24 and 25, the check valve 60 may be formed by overlapping a pair of fabric sheets. In this case, the fabric sheet located on the vehicle inner side is referred to as a first valve body portion 61, and the fabric sheet located on the vehicle outer side is referred to as a second valve body 62. The valve body portions 61, 62 are joined together to form a cylindrical check valve 60. The rear portions of the valve body portions 61, 62 are joined together by a second edge joint portion 68. The first embodiment is different from this modification in that the single fabric sheet 58 is folded in half, and the folded part is referred to as the second edge joint portion 68. The rigid portions 65 may be formed by a material other than sewing threads on condition that the rigid portions 65 extend along the gas flowing direction and are harder to flex than the flexible portions 64, and are located on or in the vicinity of the auxiliary joint portion 69 of the check valve 60. For example, elongated plates made of synthetic resin or metal may be used as rigid portions 65.

Figure 26:
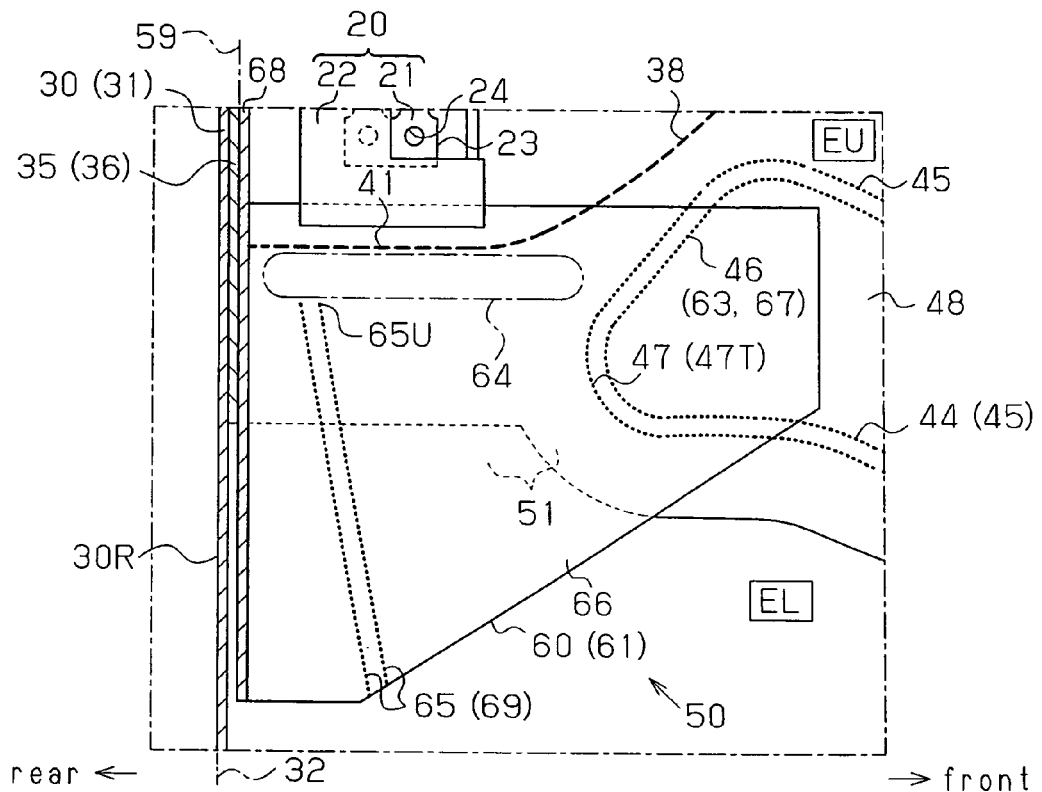
FIG. 26 is partial a cross-sectional view illustrating a check valve of a modification.

As shown in FIG. 26, the rigid portions 65 may extend in a direction that intersects the second edge joint portion 68 (the folding line 59). This allows the flow passage area DS between the valve body portions 61, 62 to be adjusted, so that the flow rate of the inflation gas G is adjusted. For example, as the angle of intersection increases, the distance between the rigid portions 65 and the first edge joint portion 67 is reduced, and the flow passage area DS is reduced. This reduces the flow rate of the inflation gas G that flows into the lower inflation portion EL.

Figure 27:
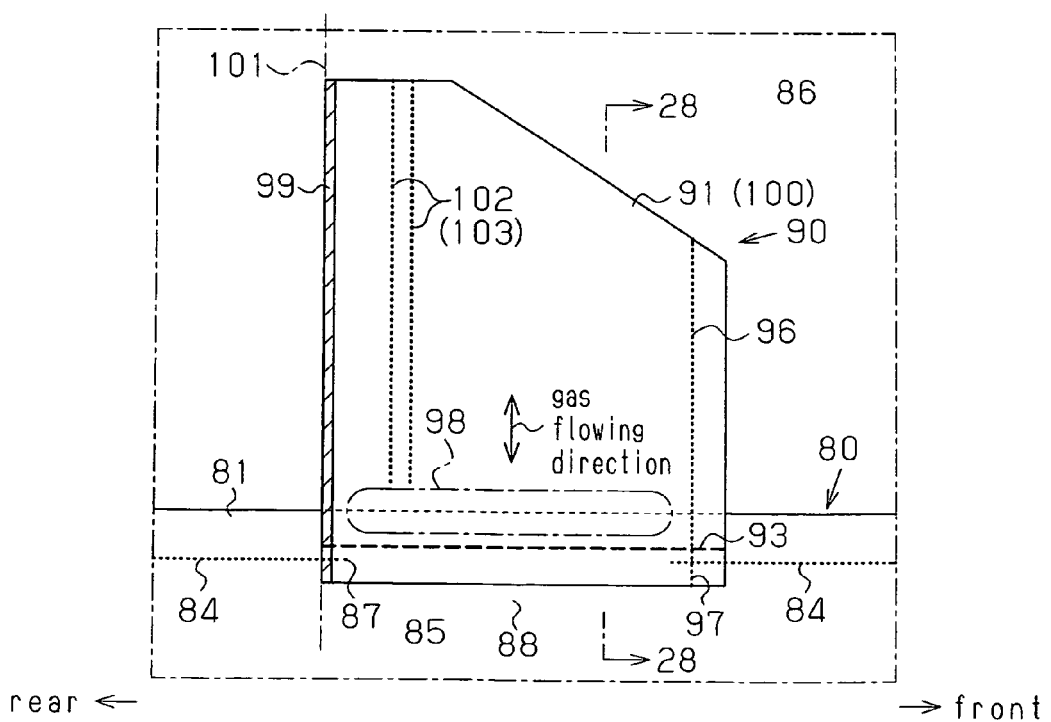
FIG. 27 is a cross-sectional view illustrating a modification in which a check valve is formed in a tether.
Figure 28:
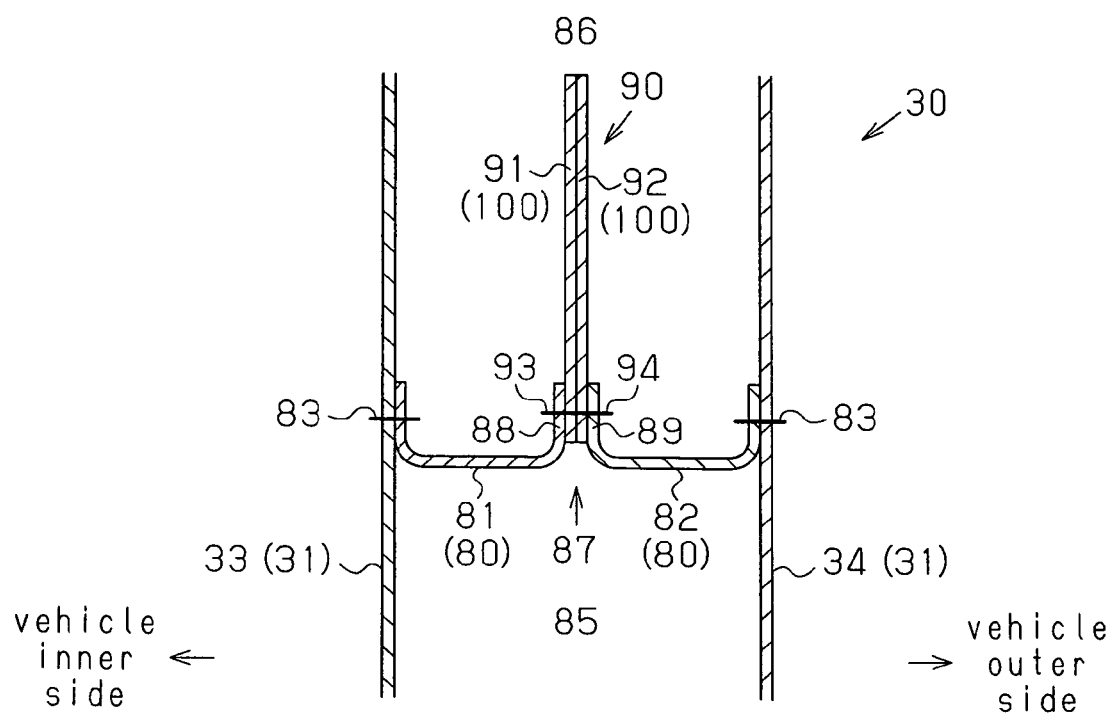
FIG. 28 is a partial cross-sectional view taken along line 28-28 of FIG. 27.

In an airbag apparatus having a tether for dividing the interior of the airbag into a plurality of inflation portions, a check valve may be provided in the tether as shown in FIGS. 27 and 28. The tether 80 includes a pair of tether pieces 81, 82. One edge (left edge as viewed in FIG. 28) of the tether piece 81 is joined to the fabric portion 33 of the airbag 30 by an edge joint portion 83. Another edge (right edge as viewed in FIG. 28) of the tether piece 82 is joined to the fabric portion 34 of the airbag 30 by an edge joint portion 83. Further, the other edges of the tether pieces 81, 82 are joined to each other by an edge joint portion 84. In this manner, the tether 80 is extends between the fabric portion 33 and the fabric portion 34 of the airbag 30. The tether 80 is bent upward when the airbag 30 is not inflated. The edge joint portions 83, 84 may be formed by adhesion using adhesive, instead of sewing threads. This modification may be applied to the outflow-side joint portions 93, 94, a first edge joint portion 96, a wall joint portion 97, an auxiliary joint portion 103, and the rigid portions 102.

The interior of the airbag 30 is divided into a lower inflation portion and an upper inflation portion by the tether 80 serving as the boundary. In this modification, the former is used as a gas outflow inflation portion 85, and the latter is used as a gas inflow inflation portion 86. The gas outflow inflation portion 85 is inflated by a relatively low internal pressure and protects the thorax PT, which has a relatively low impact resistance, and the gas inflow inflation portion 86 is inflated by an internal pressure higher than that of the gas outflow inflation portion 85, and protects a shoulder PS, which has a higher impact resistance than the thorax PT. Besides dividing the airbag 30 into the two inflation portions 85, 86, the tether 80 restricts the thickness of the airbag 30 when it is inflated.

A communication passage 87 is provided in a part of the edge joint portion 84. The communication passage 87 connects the gas outflow inflation portion 85 and the gas inflow inflation portion 86 to each other. The communication passage 87 is provided between the tether pieces 81, 82 and at a portion where the tether pieces 81, 82 are not joined together by the edge joint portion 84. A part of the tether piece 81 forms a first communication passage wall 88 of the communication passage 87, while a part of the tether piece 82 forms a second communication passage wall 89 of the communication passage 87. The first and second communication passage walls 88, 89 are flat and laid on top of each other when the inflation portions 85, 86 are not inflated.

A check valve 90 is formed by folding a single fabric sheet 100 in half along a folding line 101. The check valve 90 includes a first valve body portion 91 located on the vehicle inner side and a second valve body portion 92 located on the vehicle outer side. The valve body portions 91, 92 are laid on top of each other in a flat state when the inflation portions 85, 86 are not inflated.

The lower end of the first valve body portion 91 is joined to the first communication passage wall 88 by the first outflow-side joint portion 93. The lower end of the second valve body portion 92 is joined to the second communication passage wall 89 by the second outflow-side joint portion 94. The lower ends of the valve body portions 91, 92 are not joined to each other.

The front edges of the valve body portions 91, 92 are joined to the corresponding communication passage walls 88, 89 by the first edge joint portion 96. In this modification, the front edges of the valve body portions 91, 92 are joined to each other by the first edge joint portion 96. Further; the lower ends f the front edges of the valve body portions 91, 92 are joined to the communication passage walls 88, 89. That is, at the front lower ends of the valve body portions 91, 92, the valve body portions 91, 92 and the communication passage walls 88, 89 are joined to each other. The lower end of the first edge joint portion 96 is formed by sewing the front edges of the valve body portions 91, 92 and the communication passage walls 88, 89 together. The first edge joint portion 96 extends from the upper end of the valve body portions 91, 92 toward the gas outflow inflation portion 85. The lower end of the first edge joint portion 96 intersects the edge joint portion 84 and the outflow-side joint portions 93, 94. A lower part of the first edge joint portion 96 also serves as the wall joint portion 97. The wall joint portion 97 is located on or in the vicinity of the first edge joint portion 96, and joins the communication passage walls 88, 89 to each other.

As indicated by an alternate long and short dash line in FIG. 27, the valve body portions 91, 92 each have a flexible portion 98. The flexible portion 98 is easily flexed toward the gas outflow inflation portion 85 (downward as viewed in FIG. 27) by the pressure of the inflation gas G. The flexible portion 98 is located between the outflow-side joint portions 93, 94 and the gas inflow inflation portion 86 and in the vicinity of the outflow-side joint portions 93, 94.

The rear portions of the valve body portions 91, 92 are joined together by a second edge joint portion 99. In this modification, the single fabric sheet 100 is folded in half along the folding line 101, so as to form the first and second valve body portions 91, 92. Accordingly, the folded back portion, that is, a part including the folding line 101 corresponds to a second edge joint portion 99.

Further, rigid portions 102 are provided in the rear parts of the valve body portions 91, 92, that is, a part of the fabric sheet 100 that is forward of the folding line 101. The rigid portions 102 extend toward the gas inflow inflation portion 86 from positions in the vicinity of the upper ends of the flexible portions 98, that is, from a position that is separated upward from the outflow-side joint portions 93, 94 by a predetermined distance. The rigid portions 102 are formed by sewing the valve body portions 91, 92 with sewing threads in a single or multiple rows. The rigid portions 102 are more rigid and harder to flex than the flexible portions 98 and other parts of the check valve 90.

The rigid portions 102 also function as the auxiliary joint portion 103. The auxiliary joint portion 103 is located between the first edge joint portion 96 and the second edge joint portion 99, and in the vicinity of the second edge joint portion 99. The auxiliary joint portion 103 joins the valve body portions 91, 92 to each other. The auxiliary joint portion 103 extends toward the gas inflow inflation portion 86 from the vicinity of the upper end of the flexible portions 98, that is, from a position separated upward from the outflow-side joint portions 93, 94 by a predetermined distance. This modification has the same advantages as the first embodiment.

In the first embodiment, the inclined portions 66 of the valve body portions 61, 62 may be omitted. Also, the outflow-side joint portion 41, 42, 93, 94 do not need to be substantially perpendicular to the flowing direction of the inflation gas G in the communication passages 50, 87, as long as they intersect the flowing direction.

If the internal pressures of the upper and lower inflation portions EU, EL are set to be different such that the internal pressure of the upper inflation portion EU is lower than that of the lower inflation portion EL, the check valves 60, 90 easily operate. Means for generating a difference in internal pressure includes vent holes formed in the upper inflation portion EU or both in the upper and lower inflation portions EU, EL. In this case, the size of each vent hole needs to be adjusted such that the amount of inflation gas G discharged from the lower inflation portion EL86 is smaller than the upper inflation portion EU85.

The storage portion 15 may be provided in the body side portion 11, instead of in the seat back 14. The present invention may be applied to an airbag apparatus of a type different from the above described side airbag apparatus.

The invention claimed is:

1. An airbag apparatus comprising an airbag and a check valve, wherein the airbag has a plurality of inflation portions inflated by inflation gas, an adjacent pair of the inflation portions being connected to each other by a communication passage formed by a pair of communication passage walls, wherein the check valve has a pair of valve body portions provided in the communication passage, one of the inflation portions being a gas inflow inflation portion, which is inflated and deployed by a relatively high internal pressure, and another inflation portion being a gas outflow inflation portion, which is inflated and deployed by an internal pressure that is lower than that of the gas inflow inflation portion, wherein the check valve restricts flow of the inflation gas from the gas inflow inflation portion to the gas outflow inflation portion, the airbag apparatus being characterized in that end portions of the valve body portions that are in the vicinity of the gas outflow inflation are each connected to corresponding one of the communication passage wall by an outflow-side joint portion extending in a direction intersecting a direction in which the inflation gas flows through the communication passage, wherein each valve body portion has a flexible portion that is located in the vicinity of the outflow-side joint portion and between the outflow-side joint portion and the gas inflow inflation portion, wherein the flexible portion can be flexed toward the gas outflow inflation portion, wherein a first edge joint portion is provided on a side edge of one of the valve body portions, the first edge joint portion being used for joining the valve body portion to the corresponding communication passage wall, wherein a wall joint portion is provided on or in the vicinity of the first edge joint portion, the wall joint portion being used for joining the communication passage walls to each other, wherein a second edge joint portion is provided on a side edge of the other valve body portion, the second edge joint portion being used for joining the valve body portions to each other, and the second edge joint portion extending along the flowing direction of the inflation gas, wherein an auxiliary joint portion is provided in the vicinity of the second edge joint portion and between the first edge joint portion and the second edge joint portion, the auxiliary joint portion being used for joining the valve body portions to each other, and the auxiliary joint portion extending from the vicinity of the flexible portions toward the gas inflow inflation portion, and wherein a rigid portion, which is harder to flex than the flexible portion, is provided on or in the vicinity of the auxiliary joint portion, the rigid portion extending along the flowing direction of the inflation gas.

2. The airbag apparatus according to claim 1, characterized in that the length of the rigid portion is longer than the distance between a spot of the wall joint portion at which the distance from the rigid portion is smallest and ends of the outflow-side joint portions that are close to the rigid portion.

3. The airbag apparatus according to claim 2, characterized by a gas supply source that supplies the inflation gas into the airbag, wherein an end of the gas supply source that is close to the gas inflow inflation portion is located in the gas outflow inflation portion.

4. The airbag apparatus according to claim 2, characterized in that the rigid portion is formed by sewing the valve body portions together with sewing threads.

5. The airbag apparatus according to claim 2, characterized in that the inflation gas is supplied into the airbag in response to an impact from a side of the vehicle, wherein the airbag is caused to pop out forward by the inflation gas and is inflated and deployed between a body side portion of the vehicle and an occupant seated on a vehicle seat.

6. The airbag apparatus according to claim 1, characterized by a gas supply source that supplies the inflation gas into the airbag, wherein an end of the gas supply source that is close to the gas inflow inflation portion is located in the gas outflow inflation portion.

7. The airbag apparatus according to claim 1, characterized in that the rigid portion is formed by sewing the valve body portions together with sewing threads.

8. The airbag apparatus according to claim 1, characterized in that the inflation gas is supplied into the airbag in response to an impact from a side of the vehicle, wherein the airbag is caused to pop out forward by the inflation gas and is inflated and deployed between a body side portion of the vehicle and an occupant seated on a vehicle seat.

9. The airbag apparatus according to claim 8, characterized in that the gas inflow inflation portion is a lower inflation portion, which is inflated and deployed in the vicinity of the lumbar region of the occupant, and the gas outflow inflation portion is an upper inflation portion, which is inflated and deployed in the vicinity of the thorax of the occupant, and wherein the upper inflation portion is located above the lower inflation portion.

* * * * *